(12) United States Patent
Proud et al.

(10) Patent No.: US 9,076,137 B2
(45) Date of Patent: Jul. 7, 2015

(54) SYSTEMS AND METHODS FACILITATING MOBILE RETAIL ENVIRONMENTS

(75) Inventors: Brett Proud, Toronto (CA); Jose-Manuel Aldomar, Toronto (CA); Ramez Hanna, Toronto (CA); Jim Fitzgerald, Toronto (CA)

(73) Assignee: GUESTLOGIX, INC., Toronto (CA)

( * ) Notice: Subject to any disclaimer, the term of this patent is extended or adjusted under 35 U.S.C. 154(b) by 270 days.

(21) Appl. No.: 13/090,647

(22) Filed: Apr. 20, 2011

(65) Prior Publication Data

US 2011/0196754 A1 Aug. 11, 2011

Related U.S. Application Data

(63) Continuation of application No. 12/481,505, filed on Jun. 9, 2009.

(60) Provisional application No. 61/060,071, filed on Jun. 9, 2008.

(51) Int. Cl.
*G06Q 20/20* (2012.01)
*G06Q 20/32* (2012.01)
(Continued)

(52) U.S. Cl.
CPC .............. *G06Q 20/20* (2013.01); *G06Q 20/202* (2013.01); *G06Q 20/3224* (2013.01); *G06Q 30/06* (2013.01); *G07G 1/0009* (2013.01); *G07G 1/14* (2013.01)

(58) Field of Classification Search
USPC .................. 705/16, 35, 44; 455/422.1, 456.3; 725/23, 77; 235/375, 376, 383, 385
See application file for complete search history.

(56) References Cited

U.S. PATENT DOCUMENTS 5,367,452 A 11/1994 Gallery et al.
5,412,193 A 5/1995 Swartz
(Continued)

FOREIGN PATENT DOCUMENTS

DE 4443018 6/1996
EP 1455293 9/2004
(Continued)

OTHER PUBLICATIONS

Notice of the First Office Action for Chinese Application No. 200980131035.6 dated Jan. 12, 2012. English Translation available.
(Continued)

*Primary Examiner* — Andrew J Rudy
(74) *Attorney, Agent, or Firm* — Patterson Thuente Pedersen, P.A.

(57) ABSTRACT

An automated system for facilitating sales in dynamically-changing mobile retail environments includes a vendor/supplier connector module, a carrier connector module, a provisioning module, and a point-of-sale (POS) customization module. The vendor/supplier connector module facilitates automated exchange of product data with a plurality of different vendors or suppliers of products or services. The carrier connector module facilitates automated exchange of transportation data with a plurality of different carriers, with the transportation data corresponding to specific mobile retail environments. The provisioning module automatically determines, based on the product data and on the transportation data, products or services corresponding to a specific mobile retail environment. The POS customization module automatically generates re-configuration data for each of a plurality of POS interfaces. The re-configuration data limits each of the plurality of POS interfaces to facilitating sales of only the subset of the set of products or services that corresponds to a specific mobile retail environment.

19 Claims, 44 Drawing Sheets

(51) Int. Cl.
*G06Q 30/06* (2012.01)
*G07G 1/00* (2006.01)
*G07G 1/14* (2006.01)

(56) References Cited

U.S. PATENT DOCUMENTS

| | | | |
|---|---|---|---|
| 5,666,493 A * | 9/1997 | Wojcik et al. | 705/22 |
| 5,873,069 A | 2/1999 | Reuhl et al. | |
| 5,973,619 A | 10/1999 | Paredes | |
| 6,003,008 A | 12/1999 | Postrel et al. | |
| 6,014,090 A | 1/2000 | Rosen et al. | |
| 6,060,993 A | 5/2000 | Cohen | |
| 6,133,853 A | 10/2000 | Obradovich et al. | |
| 6,151,582 A | 11/2000 | Huang et al. | |
| 6,177,887 B1 | 1/2001 | Jerome | |
| 6,188,991 B1 | 2/2001 | Rosenweig et al. | |
| 6,327,570 B1 * | 12/2001 | Stevens | 705/7.29 |
| 6,343,317 B1 | 1/2002 | Glorikian | |
| 6,390,366 B1 | 5/2002 | Heidenreich et al. | |
| 6,460,020 B1 | 10/2002 | Pool et al. | |
| 6,609,107 B1 | 8/2003 | Shim | |
| 6,754,636 B1 | 6/2004 | Walker et al. | |
| 6,873,260 B2 * | 3/2005 | Lancos et al. | 340/573.1 |
| 6,882,290 B2 | 4/2005 | French et al. | |
| 6,920,319 B2 | 7/2005 | Knutsson et al. | |
| 6,988,078 B1 | 1/2006 | Heidenreich et al. | |
| 7,103,008 B2 * | 9/2006 | Greenblat et al. | 370/258 |
| 7,171,369 B1 | 1/2007 | Bertram et al. | |
| 7,177,826 B2 | 2/2007 | Nishiwaki et al. | |
| 7,206,757 B2 | 4/2007 | Seigel et al. | |
| 7,298,327 B2 | 11/2007 | Dupray et al. | |
| 7,380,725 B2 * | 6/2008 | McGill | 235/472.01 |
| 7,493,083 B2 * | 2/2009 | Fuccello | 455/41.2 |
| 7,497,370 B2 * | 3/2009 | Allen et al. | 235/375 |
| 7,535,367 B2 | 5/2009 | Ratnakar | |
| 7,599,691 B1 | 10/2009 | Mitchell | |
| 7,658,323 B2 * | 2/2010 | Kleinman et al. | 235/380 |
| 7,681,790 B2 | 3/2010 | Birmingham et al. | |
| 7,685,953 B2 | 3/2010 | Giles | |
| 7,725,350 B2 * | 5/2010 | Schlee | 705/14.49 |
| 7,747,704 B2 | 6/2010 | Parupudi et al. | |
| 7,783,507 B2 | 8/2010 | Schick et al. | |
| 7,797,204 B2 | 9/2010 | Balent | |
| 7,853,272 B2 | 12/2010 | Tipnis et al. | |
| 8,328,094 B2 | 12/2012 | Proud et al. | |
| 8,494,878 B2 * | 7/2013 | Stevens | 705/3 |
| 8,744,920 B2 | 6/2014 | Aldomar et al. | |
| 2001/0016825 A1 | 8/2001 | Pugliese, III et al. | |
| 2001/0037250 A1 | 11/2001 | Lefkowitz | |
| 2001/0051876 A1 | 12/2001 | Seigel et al. | |
| 2002/0049656 A1 * | 4/2002 | Lancos et al. | 705/35 |
| 2002/0087384 A1 | 7/2002 | Neifeld | |
| 2002/0087522 A1 | 7/2002 | MacGregor et al. | |
| 2002/0143655 A1 | 10/2002 | Elston et al. | |
| 2002/0178451 A1 | 11/2002 | Ficco | |
| 2003/0023456 A1 | 1/2003 | Dilollo et al. | |
| 2003/0046701 A1 | 3/2003 | O'Donnell | |
| 2003/0093323 A1 | 5/2003 | Kenyon | |
| 2003/0093798 A1 | 5/2003 | Rogerson | |
| 2003/0172090 A1 | 9/2003 | Asunmaa et al. | |
| 2003/0191698 A1 | 10/2003 | Brown et al. | |
| 2003/0220841 A1 | 11/2003 | Maritzen | |
| 2003/0229897 A1 | 12/2003 | Frisco et al. | |
| 2004/0210450 A1 | 10/2004 | Atencio et al. | |
| 2005/0132407 A1 | 6/2005 | Boyer, Jr. et al. | |
| 2007/0050279 A1 | 3/2007 | Huang et al. | |
| 2007/0112673 A1 * | 5/2007 | Protti | 705/44 |
| 2007/0136140 A1 * | 6/2007 | Smith, Jr. | 705/26 |
| 2007/0198432 A1 | 8/2007 | Pitroda et al. | |
| 2008/0132212 A1 | 6/2008 | Lemond et al. | |
| 2009/0006181 A1 * | 1/2009 | Ghosh et al. | 705/10 |
| 2009/0077620 A1 * | 3/2009 | Ravi et al. | 726/1 |
| 2009/0132813 A1 | 5/2009 | Schibuk | |
| 2009/0172035 A1 | 7/2009 | Lessing et al. | |
| 2009/0231135 A1 * | 9/2009 | Chaves et al. | 340/572.1 |
| 2010/0057534 A1 | 3/2010 | Gershkoff | |
| 2010/0064327 A1 | 3/2010 | Lynch et al. | |
| 2010/0070376 A1 | 3/2010 | Proud et al. | |
| 2010/0189089 A1 | 7/2010 | Lynch et al. | |
| 2011/0019675 A1 | 1/2011 | Hellwig et al. | |
| 2011/0055915 A1 | 3/2011 | Hall et al. | |
| 2011/0301835 A1 | 12/2011 | Bongiorno et al. | |
| 2011/0313826 A1 | 12/2011 | Keen et al. | |
| 2011/0314487 A1 | 12/2011 | Keen et al. | |
| 2011/0314488 A1 | 12/2011 | Keen et al. | |
| 2011/0314489 A1 | 12/2011 | Keen et al. | |
| 2011/0314490 A1 | 12/2011 | Keen et al. | |
| 2011/0314507 A1 | 12/2011 | Keen et al. | |
| 2012/0150686 A1 | 6/2012 | Aldomar et al. | |
| 2014/0100976 A1 | 4/2014 | Aldomar et al. | |

FOREIGN PATENT DOCUMENTS

| | | |
|---|---|---|
| EP | 1415485 | 4/2011 |
| JP | 2005258510 | 9/2005 |
| WO | WO 2004/008277 A2 | 1/2004 |
| WO | WO 2004/084031 A2 | 9/2004 |
| WO | WO2006/116286 | 11/2006 |
| WO | WO 2008/031114 A2 | 3/2008 |
| WO | WO2010/080740 | 7/2010 |
| WO | WO2011/112752 | 9/2011 |

OTHER PUBLICATIONS

Written Opinion and International Search Report for International Application No. PCT/US2009/046798 dated Jan. 25, 2010.
Airline Software—Airline Maintenance Software—airline Operations Software, http://www.ifr.aero/html/ifr_uk/products.php-?prodID=2, Jun. 2, 2009, 2 pages.
Application and File History for U.S. Appl. No. 12/481,505, filed Jun. 9, 2009, inventors Proud et al.
Written Opinion for International Application No. PCT/IB2012/002458 mailed Mar. 13, 2013.
International Preliminary Report on Patentability for International Application No. PCT/IB2012/002458 mailed Apr. 17, 2014.
Chinese Notice of Third Office Action for Chinese Application No. 200980131035.6 dated May 17, 2013.
Chinese Decision of Rejection for Chinese Application No. 200980131035.6 dated Jan. 13, 2014.
International Search Report and Written Opinion for International Application No. PCT/IB2013/002759 mailed Mar. 5, 2014.
Chinese Office Action for Chinese Application No. 200980131035.6 dated Dec. 6, 2012.
European Search Report for European Application No. EP09763475 dated Jan. 31, 2013.
GuestLogix. Powering Onboard Retail. "Guestlogix to Present at the Ancillary Revenue Airline Conference 2007 in Frankfurt", Retrieved Jan. 31, 2013.
GuestLogix. "On-Board Sales are Taking Off Participate in the Greatest Channel Ever Created!", Marketing Letter Retrieved Feb. 24, 2008.
GuestLogix. "On-Board Retailing 2.0" White Paper. Retrieved Jan. 8, 2008.

* cited by examiner

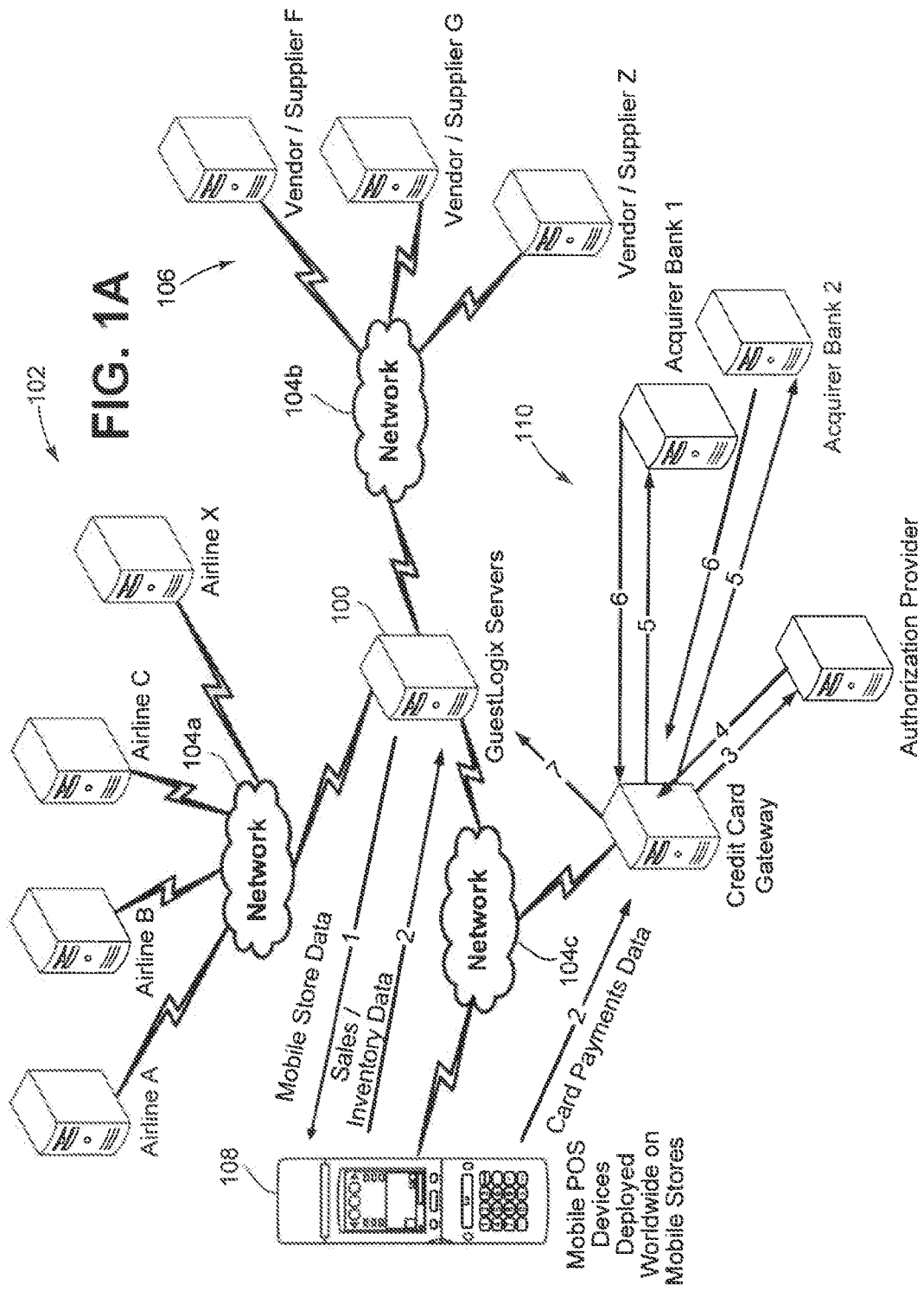

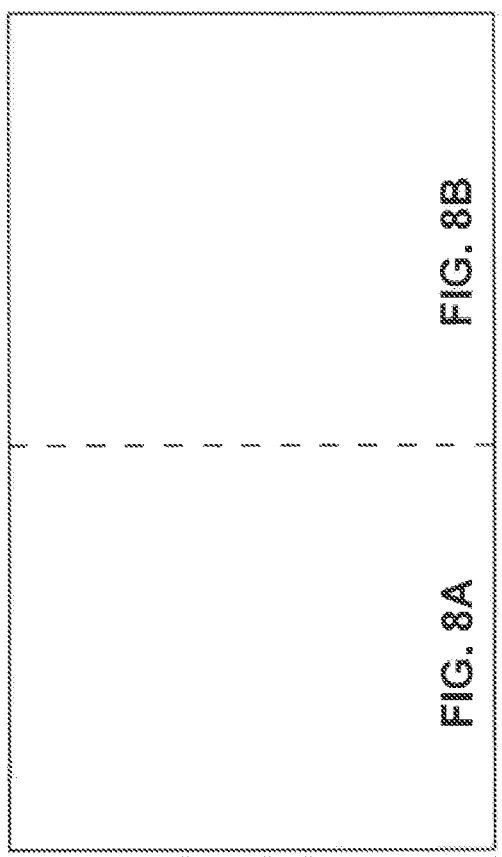

| FIG. 16A | FIG. 16B | FIG. 16C | FIG. 16D | FIG. 16E |

FIG. 16

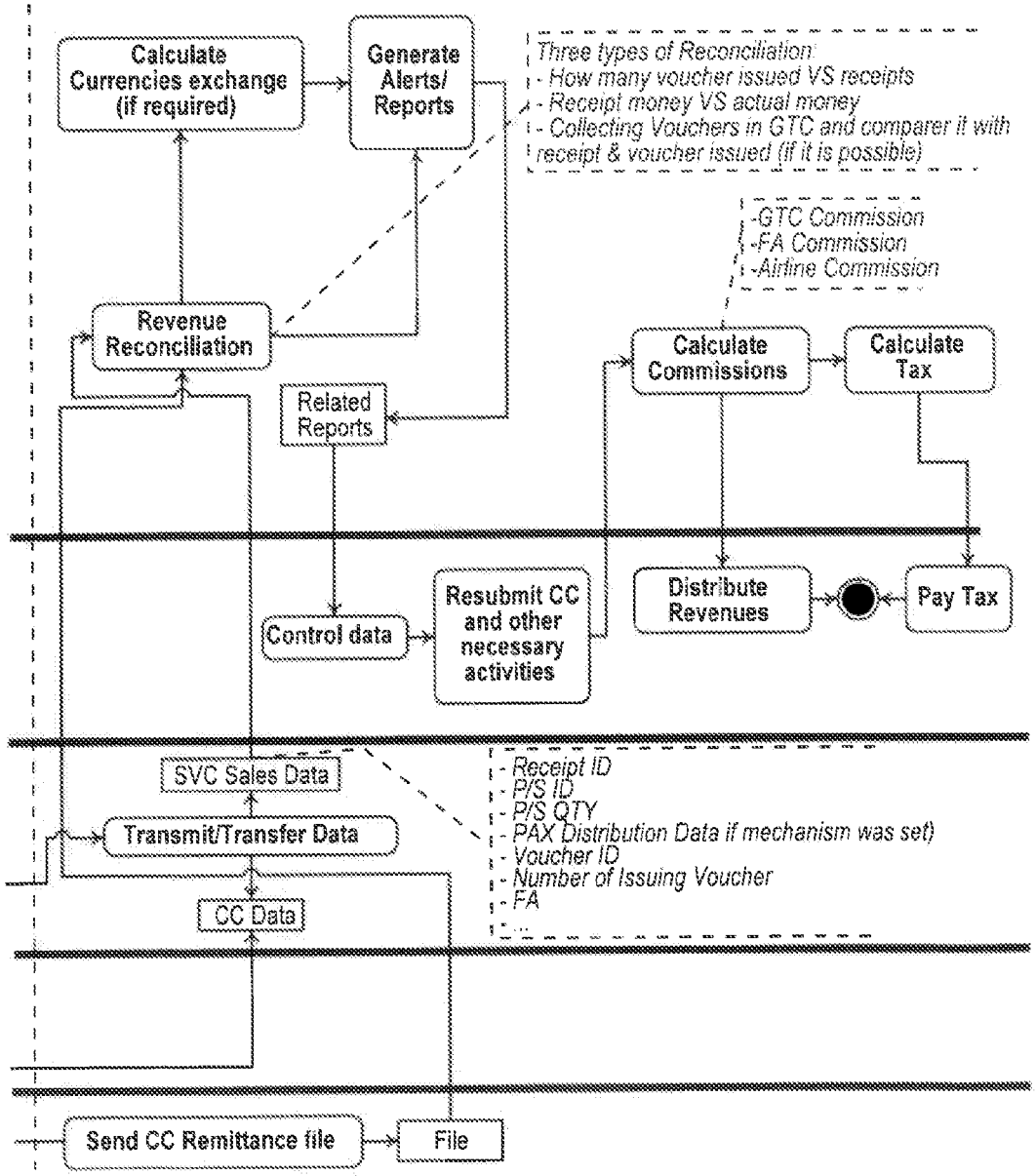

| FIG. 17B-1 | |
|---|---|
| FIG. 17B-2 | FIG. 17B-3 |
| FIG. 17B-4 | |

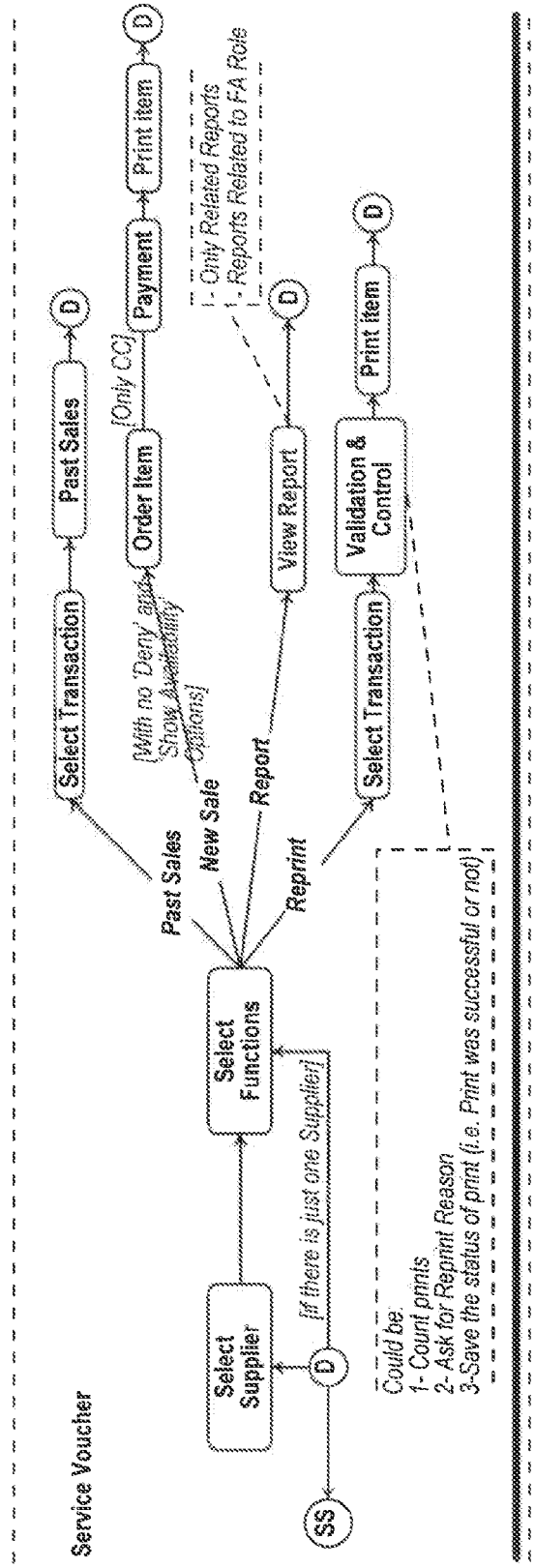

SYSTEMS AND METHODS FACILITATING MOBILE RETAIL ENVIRONMENTS

PRIOR APPLICATION

This application is a continuation of application Ser. No. 12/481,505 filed Jun. 9, 2009, which claims the benefit of U.S. Provisional Application No. 61/060,071 filed Jun. 9, 2008, the disclosures of which are incorporated by reference herein.

FIELD OF THE INVENTION

The invention relates generally to information technology and, more particularly, to data processing and communication systems that form a platform for retail sales to passengers on public transportation vehicles.

BACKGROUND OF THE INVENTION

The economic pressure on the travel industry today has never been greater. With rapidly rising fuel prices, increasing regulations, and ticket price commoditization, operators are constantly in search of opportunities to reduce operating costs and develop new approaches for profitable revenue generation.

Airline operators, for instance, first discovered ancillary revenue opportunities through advertising sales in their branded on-board magazines and buy-on board programs involving duty-free goods. This eventually spread to online bookings and self-check-in options. Today, airlines are using their web sites to sell seats, insurance, car rentals and hotel reservations. Others have extended this buying to on-board programs to provide a la carte meals and drinks, lottery tickets, phone cards, on-demand entertainment, and more. With the coming of on-board Wi-Fi communications airlines will soon be in a position to reap more profits from their captive audiences than ever before.

Average shopping time is 20 minutes in traditional retail environments, whereas typical time consumed by each flight leg can be 1-12 hours, with average travel time of 7 to 9 hours if pre- and post-flight time is added. Although the opportunity to tap the market of in-transit passengers has been known for decades, a number of particular challenges have prevented deployment of a commercial infrastructure to in-transit passengers. For example, crew personnel are not retail sales staff and would need to be trained to acquire retail sales skills. Also, there are practical difficulties in transacting with customers who are passengers seated throughout the airplane. Furthermore, importantly, the retail environment in a moving vehicle is dynamic, meaning that the inventory and services available for purchase are entirely dependent on the unique characteristics of each flight leg.

Different aircraft have different sizes and configurations; thus, the products and services that can be purchased vary by vehicle type. Also, the routes taken by aircraft make the on-board retail environments subject to different legal standards. For instance, duty-free shopping is available on international routes but not on domestic routes. Furthermore, the suppliers or vendors of products made available for on-board delivery differ by location, such that certain products are available to be stocked on-board at some departure points, but not others. Presently, the few items that airlines offer their passengers for sale on-board are listed in the back of the airlines' magazines, along with a disclaimer that selection varies by flight and to inquire further with the flight attendant. Meanwhile, the flight attendants are busy distributing food and drinks, collecting items for the trash, and otherwise carrying out their primary responsibilities and helping other passengers. Thus, passengers who would otherwise be retail customers are oftentimes dissuaded by etiquette or other social norms from bothering the flight attendants to request their service to make a purchase.

Present day in-flight sales are plagued with other difficulties and inefficiencies. Purchasing a product that is as simple as a mixed drink or a particular beverage for purchase, may require the flight attendant to first search for the bottle or mix ingredients, which could involve checking his or her food or drink cart, checking with other flight attendants, and possibly checking any additional inventory in the vehicle's galley. Too often, by the time the flight attendant reaches the later rows in the course of delivering regular service, the selection of products is depleted to a very limited assortment. Collecting payment for the purchase of a product presents a whole host of other challenges, such as making change and, if credit card transactions are facilitated, completing the transaction and reconciling payment through the usual banking channels in a timely and secure manner. Pre-ordering of special items is generally handled by airlines through their ticketing agents, and is typically limited to specific special needs items handled in small volumes on a case-by-case basis.

Another factor specific to mobile retail is that passengers are often on a travel itinerary having stopovers or changeovers, such that the particular flight on which a given passenger may be enticed to make a purchase is not the final leg of that passenger's travel. In this scenario, for items purchased on-board to be delivered at the destination point, the inventory from which a passenger may shop is unique to the passenger's itinerary.

These are just a few examples of how retailing on board transportation vehicles turns the typical retailing model upside-down. Generally speaking, for physical, store-based retailers, the typical basic business model involves numerous product (SKU) types for a relatively smaller set of physical store types. In contrast, for on-board retailing, the typical business model involves a relatively smaller set of SKU types for numerous virtual store types. The implications of these differences are multi-fold. The key impacts lie in merchandise management, supply chain planning and supply chain execution. The merchandise management function of a typical retailer focuses on product categories and even as far down to individual SKUs (and, for example, size, colors, etc.) and therefore it generally organizes its merchandising skill sets around product categories and products. However, on-board retailing completely changes this structure. Merchandising skill sets need to be organized around stores, not products and in this case, specifically around 'virtual stores'. This creates a need for unique merchandising management, supply chain planning and supply chain execution technologies to support this different organization structure and these different skill sets.

Various techniques have been proposed to automate and organize in-flight activities, such as bathroom reservations (e.g., U.S. Pat. No. 7,535,367), in-flight personal entertainment (U.S. Pat. Pub. No. 2003/0229897), travel services dispatch and advertising (U.S. Pat. No. 6,882,290). A variety of point-of-sale systems facilitating on-board sales has also been proposed that addresses some of the challenges mentioned above. However, to-date, no comprehensive solution that practically enables widely-deployed and reliable retail services for moving vehicles has been presented.

SUMMARY OF THE INVENTION

One aspect of the invention is directed to an automated system for facilitating sales in dynamically-changing mobile retail environments. The system includes a vendor/supplier connector module that is constructed to facilitate automated exchange of product data over a computer network with a plurality of different vendors or suppliers of products or services. The term module as used herein refers to a hardware implementation, or a combination of hardware and software, including, without limitation, a computer system programmed with instructions that cause the computer system to carry out the functions of the module.

The product data includes information corresponding to a set of products or services that: (a) can be ordered on board mobile retail environments, (b) can be delivered on board mobile retail environments, or both (a) and (b). The system further includes a carrier connector module that is constructed to facilitate automated exchange of transportation data over a computer network with a plurality of different carriers, wherein the transportation data includes vehicle and departure/arrival information corresponding to specific mobile retail environments.

A provisioning module that is further included in the system is communicatively coupled to the vendor/supplier connector module and to the carrier connector module. The provisioning module is constructed to automatically determine, based on the product data and on the transportation data, a plurality of subsets of the set of products or services, where each of the plurality of the subsets corresponds to a specific mobile retail environment. A point-of-sale (POS) customization module is communicatively coupled to the provisioning module, and is constructed to automatically generate re-configuration data for each of a plurality of POS interfaces. The re-configuration data limits each of the plurality of POS interfaces to facilitating sales of only the subset of the set of products or services that corresponds to a specific one of the mobile retail environments.

Another aspect of the invention is directed to an on-board point-of-sale (POS) device that receives new configuration data for a new instance of a mobile retail environment, in which new product or service information is configured. The new information can be based on transportation schedule and arrival/departure information, information corresponding passengers on the vehicle (such as pre-ordered items associated with passengers), or information corresponding to crew information specific to the vehicle departure.

A method of facilitating sales in dynamically-changing mobile retail environment according to another aspect includes automatically facilitating exchange of product data over a computer network with a plurality of different vendors or suppliers of products or services including exchange of data corresponding to a set of products or services that: (a) can be ordered in at least one on-board mobile retail environment, (b) can be delivered in at least one on-board mobile retail environment, or both (a) and (b). Additionally, the method includes automatically facilitating exchange of transportation data over a computer network with a plurality of different carriers including exchange of vehicle and departure/arrival information corresponding to at least one specific on-board mobile retail environment. The method further includes automatically determining, based on the product data and on the transportation data, a plurality of subsets of the set of products or services, each of the plurality of subsets corresponding to a specific mobile retail environment of a plurality of mobile retail environments. Re-configuration data is automatically generated for each of a plurality of POS interfaces that automatically limit each of the plurality of POS interfaces to facilitating sales of only the subset of the set of products or services that corresponds to a specific one of the plurality of mobile retail environments.

Aspects of the invention facilitates a technology platform that helps carriers realize new revenue streams by optimizing the planning and forecasting of each mobile store, facilitating on-board sales transactions (e.g. credit card acceptance) and by providing the necessary business intelligence to manage the market trends, sales and inventory associated with this new retailing model. The technology tools enable airline, rail and ferry, and other carriers to become successful on-board retailers. A number of other advantages will become apparent from the following Detailed Description of the Preferred Embodiments.

BRIEF DESCRIPTION OF THE DRAWINGS

The invention may be more completely understood in consideration of the following detailed description of various embodiments of the invention in connection with the accompanying drawings, in which:

FIG. 1A is a top-level system diagram illustrating various interactions between some of the various actors according to one type of embodiment.

FIGS. 16A-E are a flow diagram depicting one embodiment of various interactions for purposes of facilitating the presentation and sales of products and/or services via a mobile retail environment according to one embodiment.

Figure 1B:
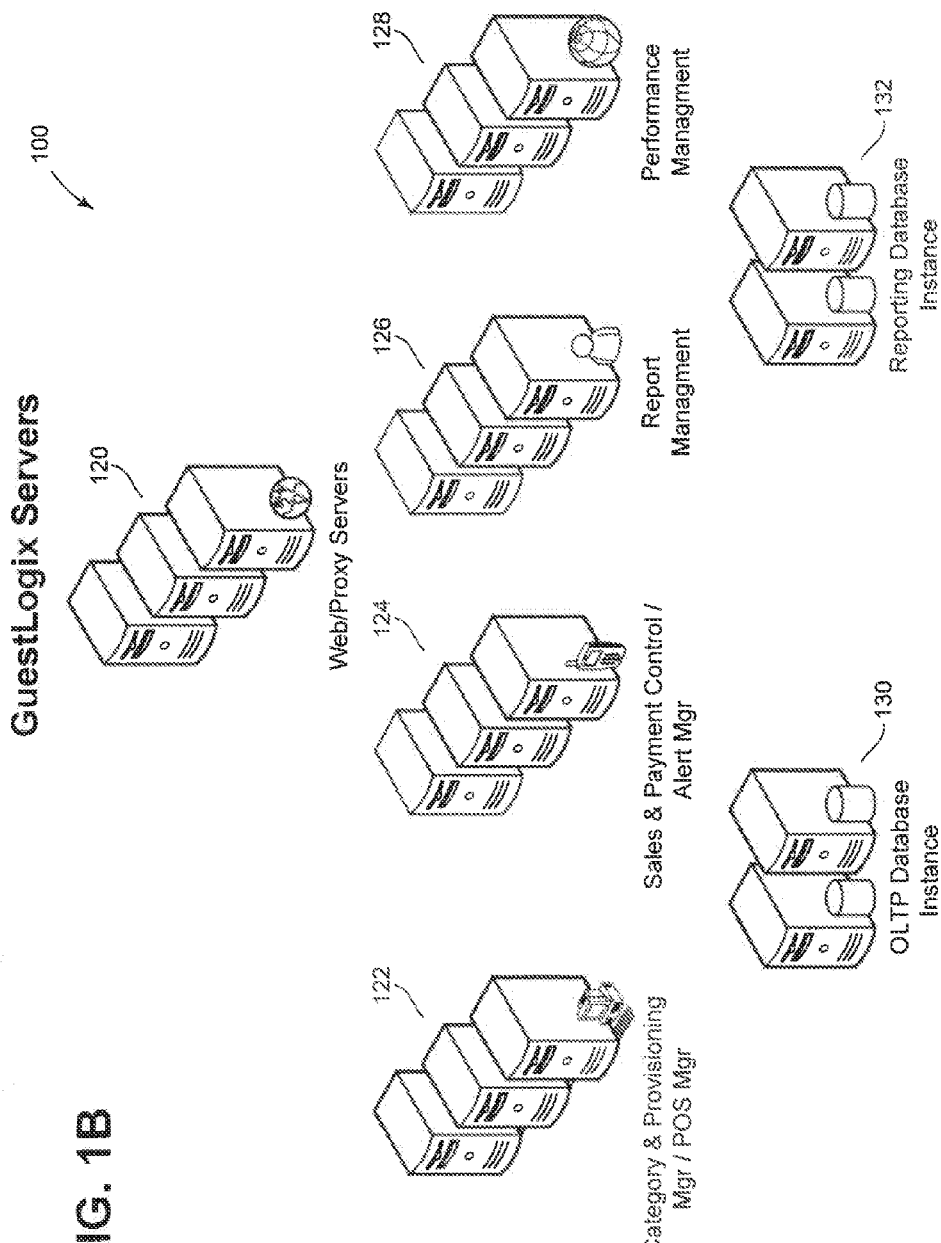
FIG. 1B is a diagram illustrating an exemplary set of servers that constitute GuestLogix servers, including web proxy servers, a category and provisioning manager and POS manager server, a sales and payment control and alert manager server, a report management server, a performance management server, an online transaction processing (OLTP) database server, and a reporting database server according to one embodiment.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE PREFERRED EMBODIMENTS

Aspects of the invention are directed to facilitating a mobile retail environment. The retail environment is termed mobile because the place where the shoppers are located is a vehicle, such as an aircraft, train, ship, bus, automobile, and the like. For the sake of simplicity, the embodiments of the invention detailed below shall be described in the context of an aircraft, where the shoppers, or customers, are passengers that are either on board the aircraft, or are persons who will be present on board the aircraft at a specified future time. In this case, the operator of the aircraft, or the carrier, is an airline company. It will be understood, however, that the invention as a whole is not limited to the case of airlines and aircraft as the mobile environment in which the mobile retail environment is facilitated, unless such a limitation is expressly made in a claim, in which case only that claim shall be so limited. Persons of skill in the relevant arts will appreciate that principles of the invention can be applied to any suitable type of vehicle and transportation service.

Accordingly, certain aspects of the invention are directed to technologies that support the full business cycle of on-board retail, where carriers operate multiple mobile retail environments (i.e., vehicles in transit) that are typically operated according to specific schedules, and different departure locations and arrival locations. The technology platform that embodies aspects of the invention creates opportunities for the carriers to entertain and enhance the experience of their passengers on-board and, at the same time, increase their ancillary revenues from the sale of products and services.

One such technology platform takes into account several distinct aspects of this specific business model to provide a comprehensive and flexible system:

a) the carriers' schedules;
b) the on-board sales retail categories combining products and services to purchase and receive on-board, with products and services to purchase on-board but for later delivery at a destination point;
c) the technology and functionality to offer only relevant products or services to current or future passengers that can practically be made available to those passengers based on their travel plans pre-departure, on-board, and post-arrival; and
d) the integration of vendors' and suppliers' products and services, including facilitation/consolidation of payment clearing and revenue distribution to all supply chain parties (including commission earners, for example).

The inventors have recognized that mobile retail environments exist as localized functions of time and space. They exist as functions of time in the sense that the flights themselves are temporary. Each flight has a beginning and an end insofar as each passenger of that flight is concerned. Similarly, mobile retail environments are functions of space in the sense that their starting point and ending point are different geographic locations. Accordingly, each flight can be stocked with physical products to be sold when the aircraft is at an airport terminal or other servicing point. Since it is impractical and undesirable for the aircraft to remain stocked with merchandise for a large number of consecutive flights, the assortment of products for sale is limited based on which suppliers or vendors at specific locations can provide the aircraft with the products. Likewise, for goods or services to be delivered or rendered at the destination point, a limited set of merchants or service providers are available at each specific destination.

The vehicles themselves are also highly variable. Widebody long-haul aircraft can offer many more services, and greater inventory stores, than smaller aircraft. Different carriers equip their aircraft with different entertainment systems, and offer different levels of service and retail selection to their passengers. Also, as discussed above, the originating and destination points define whether certain types of transactions, such as duty-free shopping, are permitted. Moreover, different individual crewmembers may have different levels of authority to offer certain services or discounts, such that the retail offerings of the mobile retail environment depends on which crewmembers are present.

Airlines, too, vary substantially in their business models insofar as on-board retail sales are concerned. Some airlines may wish to be merchants of record, that is, vendors who transact with the customers in the retail sales sense. Other airlines may simply collect commissions from sales between third party vendors and the passengers. Some airlines facilitate pre-ordering of products or services through their ticket booking channels, while others may direct customers directly to vendors for pre-ordering.

Aspects of the invention provide solutions that can address all of the above scenarios, as well as numerous other challenges that make mobile retail environments unique. In one particular aspect of the invention, information pertaining to flight schedules, departures, destinations, and status, as well as individual passenger identification and itineraries, and crew information, received from the various airlines, is combined with information relating to the various products and services, received from the various vendors or suppliers of those products and services, to specifically define each mobile retail environment. The mobile retail environment can be vehicle-specific, and vehicle- and passenger-specific. In another embodiment, the mobile retail environment can further be crew-specific. For passengers having travel itineraries with connection points, those passengers may experience multiple different mobile retail environments, with each environment corresponding to each leg of their travel.

FIG. 1A is a top-level system diagram illustrating various interactions between some of the various actors according to one type of embodiment. The GuestLogix Servers 100 interface with computer systems of each of airlines A, B, C, and X (collectively, airlines 102) over computer network 104a. The GuestLogix Servers 100 can utilize any suitable arrangement known in the art using well-known hardware and software platforms for their basic operation. The specific system implementation that embodies aspects of the invention utilizing the basic platforms will be detailed below. GuestLogix Servers 100 also interface with computer systems of each of vendors/suppliers F, G, and Z (collectively, vendors 106) via network 104b. Network 104b can be the same network as network 104a (e.g., the Internet), or they can be entirely separate networks.

GuestLogix Servers 100 are also interfaced with point-of-sale (POS) devices 108 situated on-board each of the aircraft, via network 104c, which can be the same as, or different, from networks 104a and 104b. There can be one or more POS devices 108 on each aircraft. POS devices 108 are computer devices that have a display device and a user input device, such as a keyboard or touchscreen, for example. POS devices also have a processor, memory, and communications circuitry. In one type of embodiment, POS devices 108 are hand-portable devices that may include a receipt printer and credit card reader. Other forms of input devices, such as a bar code reader, may be included. In another type of embodiment, POS devices 108 are mounted on-board the aircraft, such as in the back of most seats or in the bulkhead walls. These types of devices can be integrated with on-board media players that display videos and videogames, output sound to a set of headphones, and can include a touchscreen, videogame controller, or a variety of other input and output devices.

GuestLogix Servers 100 are further interfaced with payment processing system 110, including a credit card gateway, an authorization provider, and acquirer banks, as illustrated in FIG. 1A. These systems communicate with a back office system (BOS) of Guestlogix Servers 100 to automate the completion of financial transactions.

FIG. 1B is a diagram illustrating an exemplary set of servers that constitute GuestLogix servers 100, including web proxy servers 120, category and provisioning manager and POS manager server 122, sales and payment control and alert manager server 124, report management server 126, performance management server 128, online transaction processing (OLTP) database server 130, and reporting database server 132. The servers illustrated in FIG. 1B can be implemented in a variety of different embodiments, including being implemented as virtual servers, using one or more server farms, mirrored services, etc.

Figure 2:
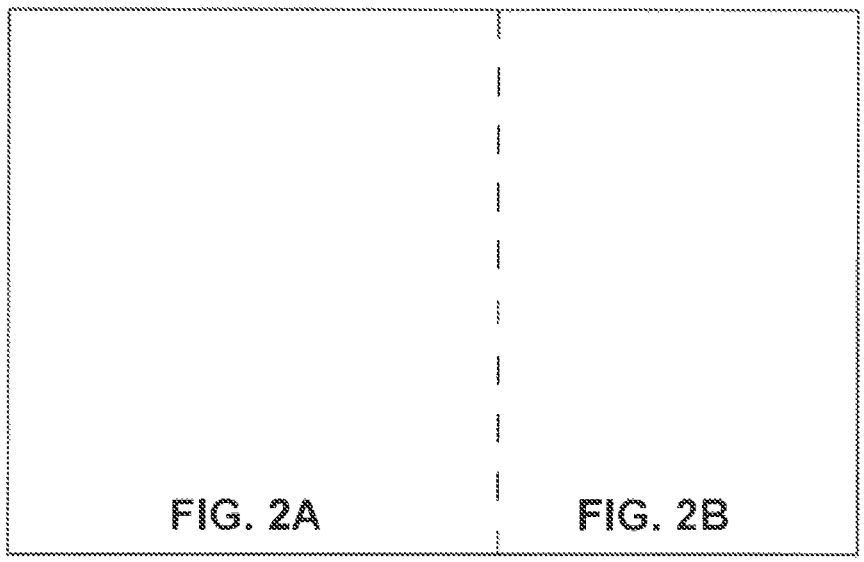
FIG. 2 illustrates an architecture of a mobile retail platform system implemented together with Guestlogix Servers according to one embodiment.
Figure 2A:
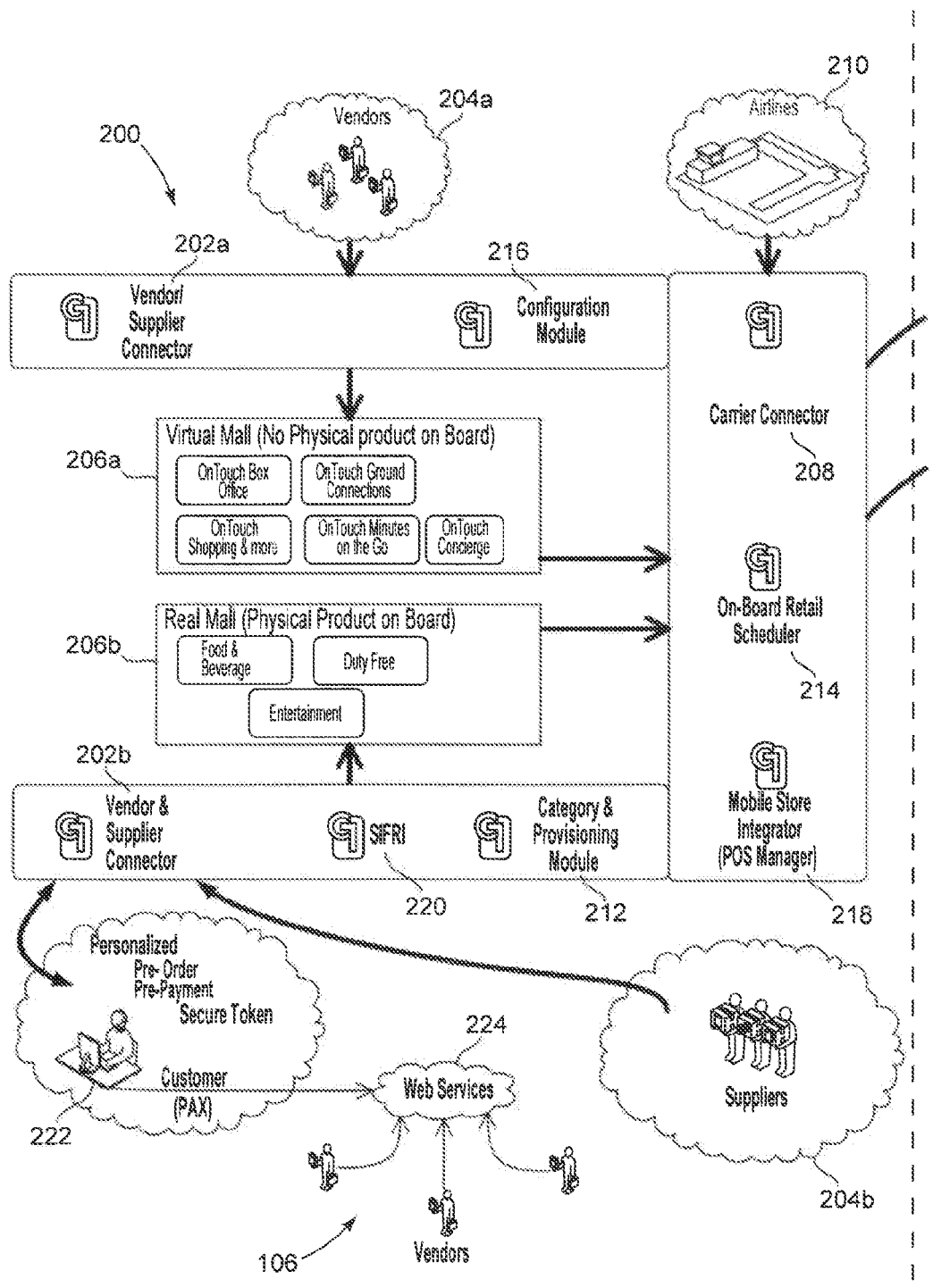
Figure 2B:
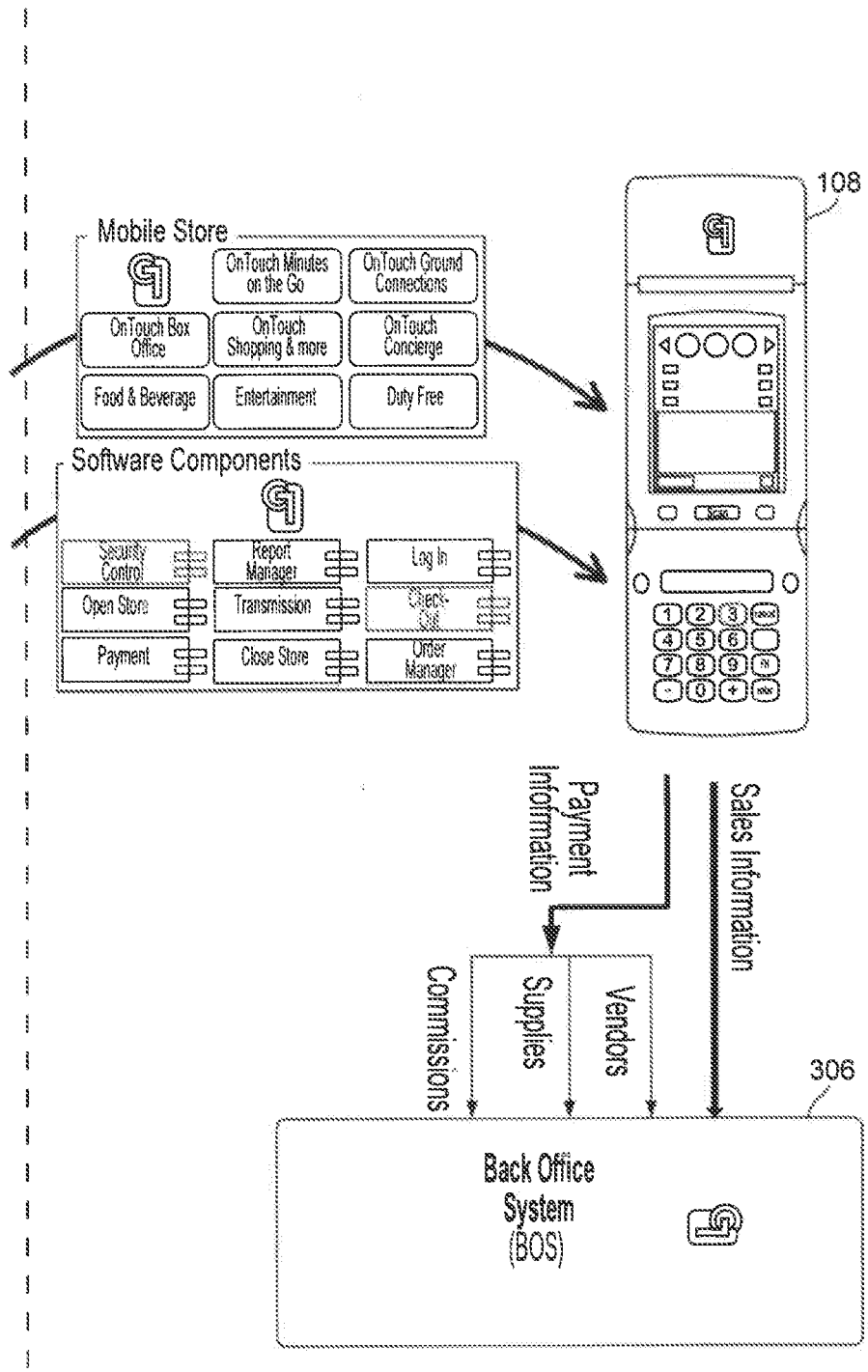

FIG. 2 illustrates an architecture of mobile retail platform system 200 implemented together with Guestlogix Servers 100 according to one embodiment. System 200 includes vendor/supplier connector modules 202a and 202b that facilitate data exchange with a plurality of different vendors 204a or suppliers 204b, or both, over a computer network. Vendors 204a are merchants who transact with customers, i.e., vendors are merchants of record, whereas suppliers are not merchants of record, but simply supply products to one or more other parties, who in turn transact with the customers.

System 200 combines retail sales of both, virtual products and services 206a, and real products and services 206b. Virtual products and services 206a are sold in a virtual mall setting, where there are no products to be delivered on board the aircraft, such as event tickets, catalog shopping, ground transportation, concierge services, telephone minutes, and the like. In the case of virtual products and services 106a, delivery or rendering of the purchased items can take place at the passenger's destination location, or at a different specified location. Real products and services 206b are sold in a real mall setting, where actual products are to be delivered to the customers in-flight. These include food and beverages for purchase, duty free shopping of items stocked on-board, and entertainment such as movies, videogames, and the like.

These examples of virtual products and services 206a and real products and services 206b are illustrative, and are not meant to be an exhaustive list of items to be sold.

Vendor and supplier connectors 202a and 202b facilitate the exchange of data representing products and services to be offered using various data protocols specific each type of vendor or supplier. In one embodiment, the data includes item information, including item name, description, SKU number, pricing, discounting, and categorization or catalog placement information. In a related embodiment, vendor and supplier connectors 202a and 202b facilitate automated ordering of merchandise.

Carrier connector 208 handles importing, integrating and exporting various transportation data from and to airlines' systems 210; operations and reservations (e.g., aircraft turns and flight schedule, crew schedule, reservations/check-in status/gate status, passenger (Pax) manifest and VIP/loyalty program information), in-flight and ground services, client relationship management (CRM) information, and other data required for specific on-board reporting.

For both, vendors/suppliers, and airlines exchanging data via connector modules 202a/b and 208, the data from each party can be standardized, or can be unique. An example of standardized data from airlines, for example, includes International Air Transport Association (IATA) Passenger and Airport Data Interchange Standards (PADIS). Otherwise, each party may have its own format. An example of a pre-established data format relating to a product is shown in Table 1 below. An example of a data format provided by an airline is presented in Table 2 below.

TABLE 1

Product Data Elements Example

| Field Name | Description | Type | Size |
|---|---|---|---|
| Active | Product active indicator | Y/N | 1 |
| Discount | Discount indicator | Y/N | 1 |
| Taxable | Tax applicable indicator | Y/N | 1 |
| Title | Product short description | Text | 255 |
| Sku | Product SKU | Alpha Numeric | 30 |
| Description | Product description | Text | 255 |
| Bar Code | Optional Product bar code | Numeric | |
| Currency | The Currency this product is priced in | Text | 3 |
| Price | Product price | | |
| Shipping_Type | The Type of shipping used for the product | Text | 30 |
| Add_Shipping_Flag | Indicate if shipping cost is to be added to the product price | Y/N | 1 |
| Product Specs | | Text | 255 |

TABLE 2

Transportation Data Example

| Field Name | Description |
|---|---|
| Flight Number | The flight number |
| Flight Date | Date and time flight is operating (optional) |
| Origin | Origin airport |
| Destination | Destination Airport |

TABLE 2-continued

Transportation Data Example

| Field Name | Description |
|---|---|
| Start Date | Effective date of the flight. (optional if the flight date is supplied) |
| End Date | Expiry date of the flight. (optional if the flight date is supplied) |
| Day of operation | Operation day of week. (optional if the flight date is supplied) |
| Aircraft (Vehicle) Type | IATA Code for Aircraft Type |
| Aircraft (V) Configuration | Galleys Configuration Code (to mapping table) |
| Aircraft Configuration Cabin | Seats per class (commercial config.) |
| Aircraft ID | Registration (International) |
| Aircraft Tail Number | Airline-based ID |
| Aircraft Base | IATA Station |
| Flight Exceptions | Listing of zero or more exceptions, these include, cancellations, delays etc. |
| Passenger Loads | Passenger count per flight leg by class of service |
| Inventory item code | The code of the inventory item |
| Inventory item description | Description of the inventory item |
| Inventory item category | The category of the inventory item, this is used to control the inventory items presented to the caterer for offload count |
| Inventory item type | This defines the type of equipment, this is used to exclude inventory items that are not for sale |
| Class of service | Class of service that this sales product supports |
| Sales Type | The sales type this item supports |
| Employee Name | Name of crew member |
| Employee Number | Employee number of crew member |
| Home Base of Employee | The home airport of the crew member, this will be used when running reports for a given base |
| Employee Classification | The classification of the crew member, this distinguishes a selling flight attendant, Master F/A or purser |
| Pairing Start Date | Start date of the crew pairing that is operating this flight |
| Pairing End Date | End date of the crew pairing, this is used to determine when the deposits are expected for a given flight |
| Purser Employee Number | Indicates which employee is acting as the purser |

Figure 3:
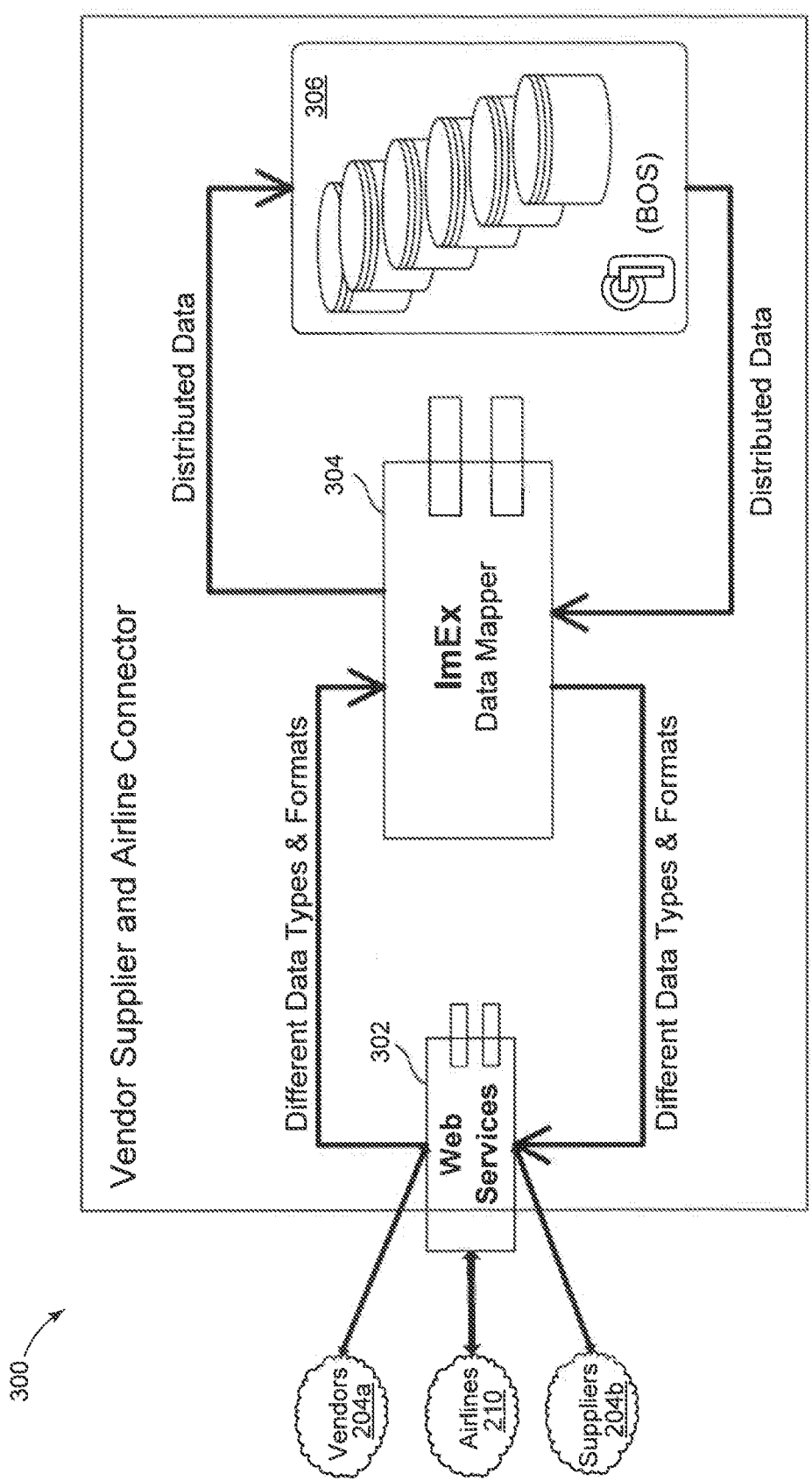
FIG. 3 illustrates a data translator adapted to translate data into a suitable format according to one embodiment.

Accordingly, the connectors 202*a/b* and 208 include a translator 300 as depicted in FIG. 3 to accept and provide data in each party's native format, and to translate the data into a format suitable for use with system 100. Translator 300 uses web services 302 to exchange information with each party in that party's native format. Web services 302 can utilize an applications programming interface (API) approach according to one type of embodiment. The data of different types and formats is fed to the ImEx data mapper 304, which converts pre-established various data layouts from almost any format using into distributed data structures used by the back office system (BOS) database 306.

Figure 4:
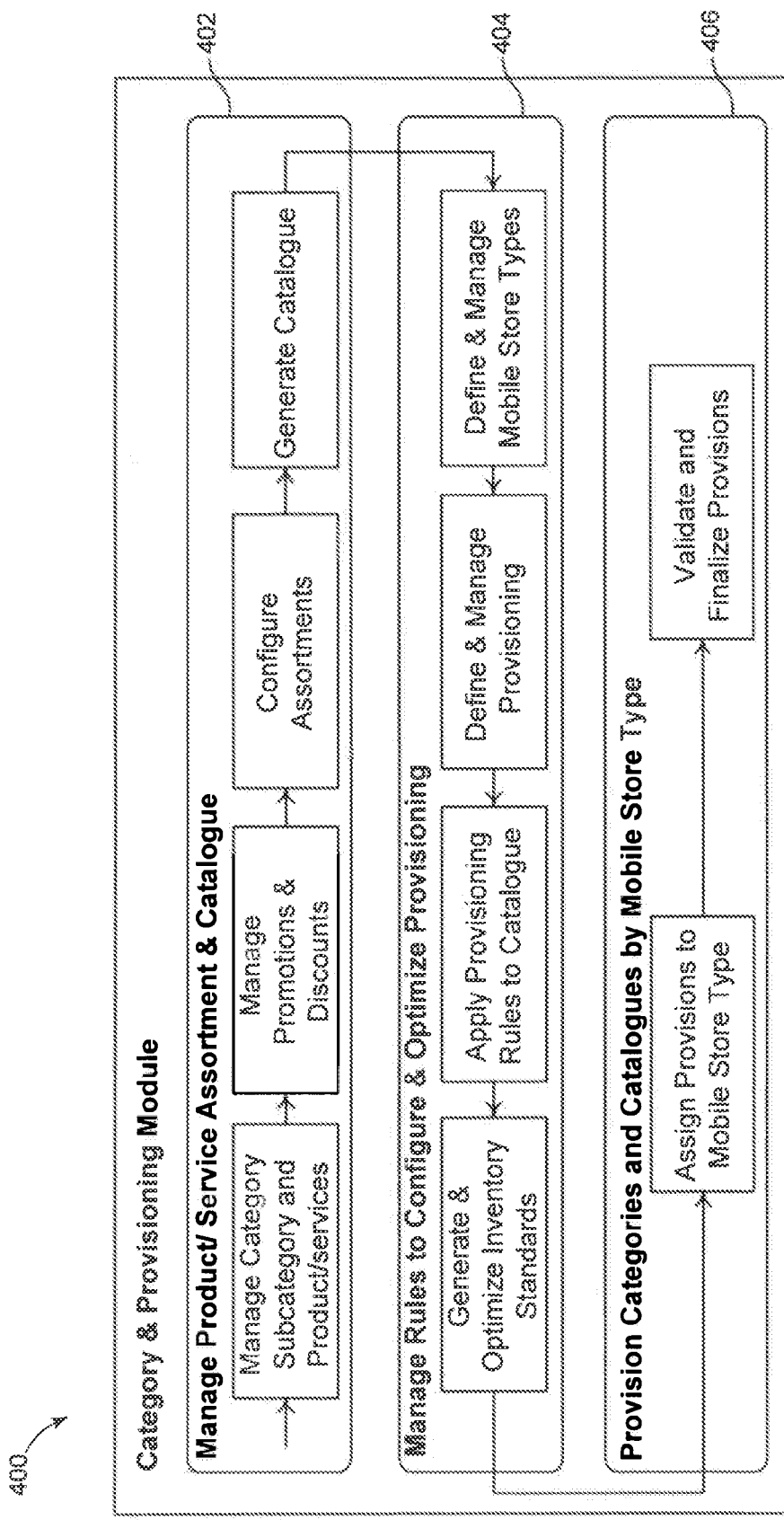
FIG. 4 is a diagram that illustrates operations of an example process performed by a category and provisioning module according to one embodiment.

Referring again to FIG. 2, system 200 further includes category and provisioning module 212, and on-board retail scheduler module 214, which together, communicate with the vendor/supplier connector modules 202*a/b* and to carrier connector module 208, and automatically determine, based on the product data and on the transportation data, subsets of the products or services to be sold or delivered on board, with each of the subsets corresponding to a specific mobile retail environment instance. FIG. 4 is a diagram that illustrates operations of an example process 400 performed by category and provisioning module 212. In the embodiment shown, category and provisioning module 212 controls three main processes:

1. The management functions 402 of categories, products or services and their different assortments into specific "Mall Menus", catalogs or inventory standards in order to be later published and associated with specific mobile store' types. This includes re-categorizing the products or services represented by the product data obtained from vendors/suppliers 204*a/b* into a new categorization hierarchy that can correspond to either individual mobile stores, or to classes of mobile stores (such as, for example, MD-80 and A319 aircraft operated by airline X. Additionally, management functions 402 include management of promotions and discounts, which can be fed to the system from either the vendors, or from the airlines. Management functions 402 can also include configuration of product/service assortments offered on specific flights (mobile stores) or on types of mobile stores, and generation of a catalog from that has specific organization of the assortments.

2. Provisioning functions 404 include managing of business and logical rules that permit automatically associating products or services, their assortments, catalogues, and their inventories (in those cases where a limited number of units/services is made available to specific mobile store types) to specific mobile stores. They also enable the definition and management of mobile store types themselves, and instances by all their attributes and relationships (for example in the case of an airline a mobile store is normally defined by the following attributes: airline ID, flight number or code, origin/destination, estimated time of departure (ETD) and date, aircraft type and configuration); and 3. Provisioning functions 406 that associate (or apply rules) relating to catalogues, mall menus, or "inventory standards" to mobile store type instances, generating the provisioning manifests that will later be associated to specific scheduled departures (mobile store departures).

Figure 5:
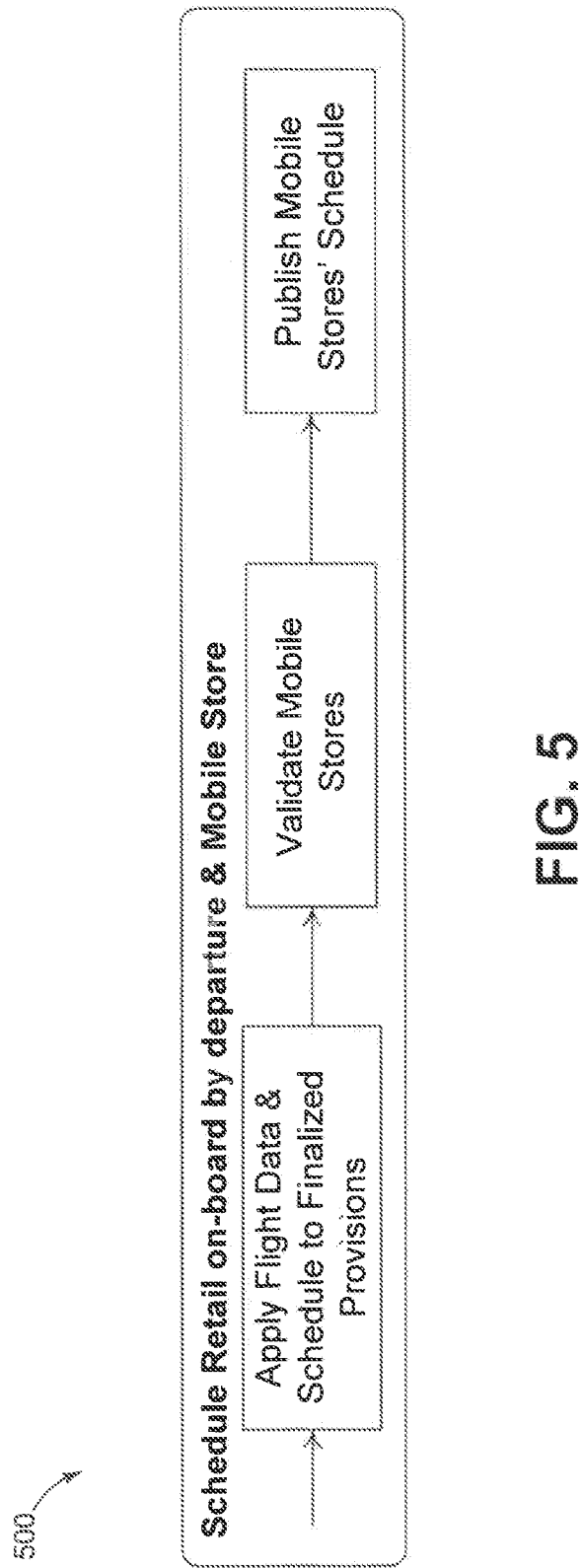
FIG. 5 illustrates an example set of scheduling operations including applying flight data and schedules to finalize provisions, validate mobile stores based on a predetermined rule set, and publish a mobile store schedule according to one embodiment.
Figure 6:
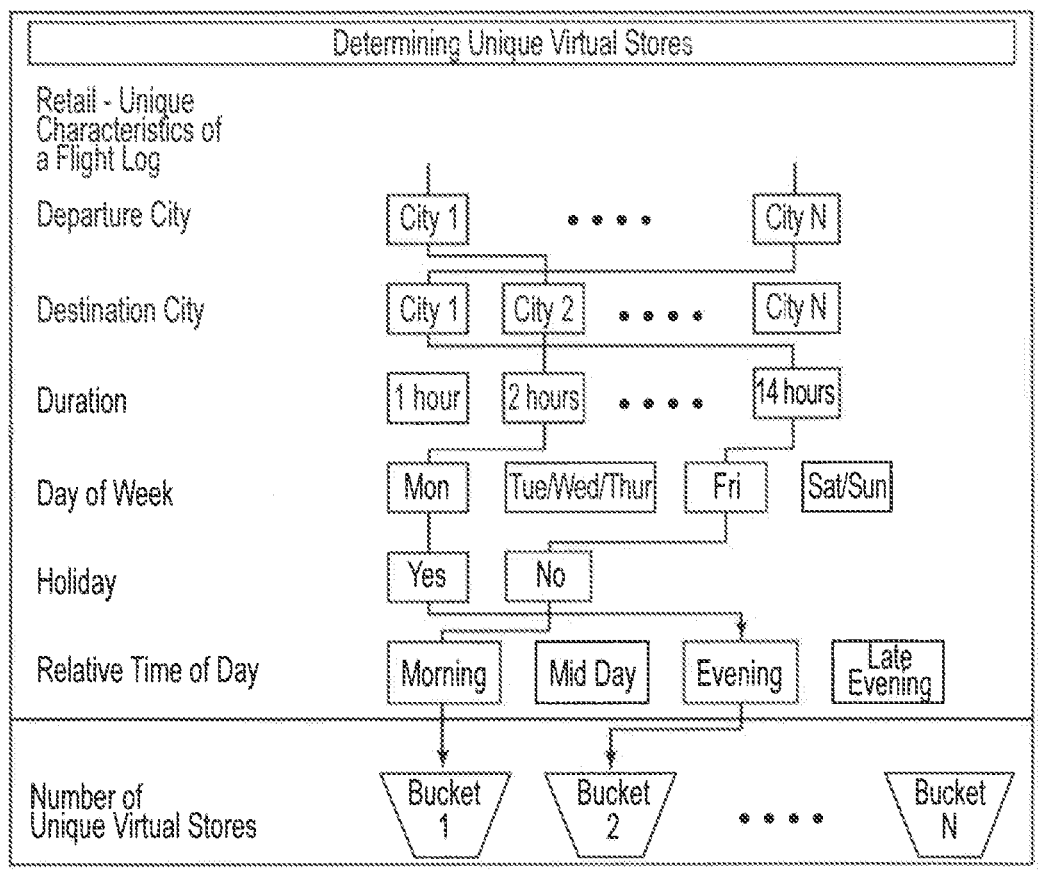
FIG. 6 illustrates an example of set of time and location criteria for determining unique virtual stores according to one embodiment.

Referring back to FIG. 2, on-board retail scheduler module 214 enables the process of creation of the specific provisioning and loading of the schedule by airline, location (station) and departure. At the output of this process, the mobile stores become actual instances of the different mobile store types and the finalized provisions are now transformed in actual departure schedules. The schedules contain data pertaining to the provisioning of the physical inventory that needs to be prepared and loaded at the different origin warehouses as well as all the data that needs to be loaded on the on-board POS devices 108 that will contain all the available categories, products and services to either be consumed on-board (pre-selected, pre-ordered or pre-purchased), be purchased and consumed on-board, and be purchased on board, but delivered or consumed at the destination or other specified location not on board. All other data provided by the airlines to facilitate the on-board retail operation to the crew members is also associated to the retail schedule in this process. FIG. 5 illustrates an example set of scheduling operations 500, including applying flight data and schedules to finalized provisions, validating the mobile stores based on a predetermined rule set, and publishing the mobile stores' schedules. FIG. 6 illustrates an example set of time and location criteria for determining unique virtual stores. In a related embodiment, passenger-specific and crew-specific virtual store configurations can also be determined.

Returning to FIG. 2, configuration module 216 analyses the transportation data and the product/service information and determines the software, referred to as the on-board retail application, that needs to be loaded into each POS Device 108. The result of this process is a determination of what software configuration needs to be uploaded to each POS device 108 for each departure, as well as all the data required for each departure and POS device itinerary, including the pre-ordering files for each mobile store. This data includes products and services available for purchase on board, as well as information about pre-ordered items, including passenger verification information and secure token information. Also, various items of crew information, promotions, checkout, payment, and other POS logic are all configured specific to each mobile store instance. Accordingly, configuration module 216 performs customization of each POS device 108 in which each POS is re-configured with data that limits each POS device 108 to facilitating sales of only the subset of the set of products or services that corresponds to a specific mobile retail environment.

Mobile store integrator module 218 communicates with configuration module 216, and performs integration and connection/transmission control for communications with each POS device 108 (or each master POS device, in situations where multiple devices are present on an aircraft and obtain their data through a gateway device in the master POS device). In one embodiment, mobile store integrator module 218 initiates the communication protocol between system 200 and the POS devices 108 in the field. Mobile store integrator module 218 identifies each POS device 108 and prepares the files to be uploaded in data batches to upload the specific configuration manifest and data manifest. The process establishes the communication handshaking with each device and controls the transmission of the different files until the communication is complete. The process includes analysis of the status of each POS device 108, i.e., if any data needs to be downloaded from each device and if the software version needs to be updated, before uploading the new files. Communications with the POS devices 108 can be via satellite communications, terrestrial cellular network, or via any other suitable data communications arrangement.

The secure in-flight retail identifier (SIFRI) system 220 facilitates pre-ordering or pre-purchasing of products or services to be delivered on-board an aircraft. The customer (PAX) 222, who is the passenger-to-be, or a person acting on behalf of the passenger-to-be, can connect to one or more vendors' 106 website(s) using web services 224. The vendor in this situation can be a seller of products or services to be delivered on board, including the airline company. The PAX 222 can access web services 224 via the airline's ticket booking system, or can be redirected to a different web site operated by, or on behalf of, a vendor 106. In this type of scenario, the PAX's 222 web browser running on a PC or mobile computing device such as a smartphone or PDA, operates as a type of POS system. In this sense, the POS system does not need to complete an order by taking payment for processing; instead, the system can simply facilitate pre-ordering items, with payment to be accepted or processed later, such as upon or after deliver on board the aircraft.

In a related embodiment, the assortment from which the PAX 222 may select products or services to pre-order or pre-purchase is generated specifically for that individual PAX based on the travel itinerary of the passenger. From the travel itinerary, the individual flights are identified, and matched with the individual aircraft and departure/arrival points. This information, in turn, is matched with available products or services that can be stocked an board each of the aircraft on which the passenger will be travelling. For example, in the case where the passenger is travelling on a series of flights, each flight is viewed as a distinct mobile store, with specific product/service offerings. Advantageously, the PAX 222 is not burdened with shopping in a clutter of conditionally available items.

Figure 7:
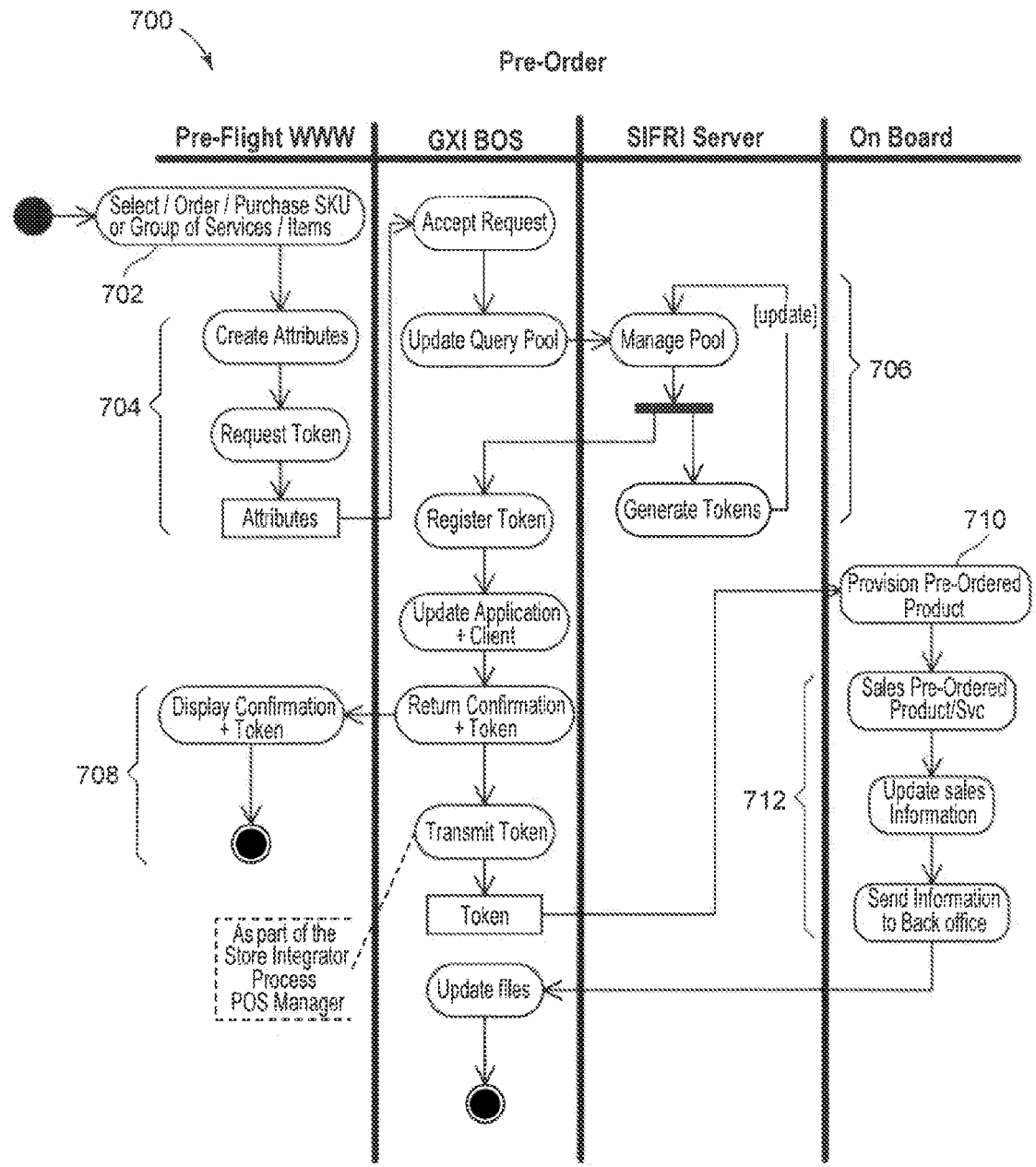
FIG. 7 is a flow diagram illustrating an example process of pre-ordering products or services for on-board delivery according to one embodiment.

FIG. 7 is a flow diagram illustrating an example process 700 of pre-ordering products or services for on-board delivery. At 702, the PAX 222 selects products/services to be ordered via the web-based POS interface. In the series of operations indicated at 704, the POS system creates generates an indicator describing attributes of the product(s) or service(s) being pre-ordered and transmits that information to the back office system (BOS). The operations indicated at 706 being carried out by the BOS and the SIFRI server result in a secure token being generated and bound to the attributes previously generated, with the binding being stored in the BOS database. Operations 708 confirm and display the token code to the PAX 222.

The operation indicated at 710 involves updating the provisioning module and POS devices with the token ID and the associated product(s) or service(s) for reserving those items for the passenger to be on board, and accounting for any changes in inventory to be ordered, stocked, or otherwise provisioned. In the case of products that are inventoried, and services that are finite in their availability (such as services that need to be scheduled or reserved), action affecting inventory of those items is generally necessary. Otherwise, for services of unlimited availability, such as on-demand movies, simply provisioning those items to be present on board may be sufficient. The operations indicated at 712 facilitate completing the sales transaction on board the aircraft using a POS device. The passenger completing the purchase produces either the secure token ID, or some other item of authentication information that is bound to the secure token, such as, for instance, a driver's license or credit card. In a related embodiment, traveler information supplied by the airline, such as loyalty program member number (i.e., frequent flyer code), credit card information for the credit card used to book the travel, travel confirmation number, seat assignment, or the like, is bound with the secure token.

Turning again to FIG. 2, at the conclusion of each flight (i.e., at the end of each mobile store, or mobile retail environment, instance, on-board POS device 108 transmits sales information and payment information relating to vendors, suppliers, and commissions, to BOS 306 for further processing.

Figure 8A:
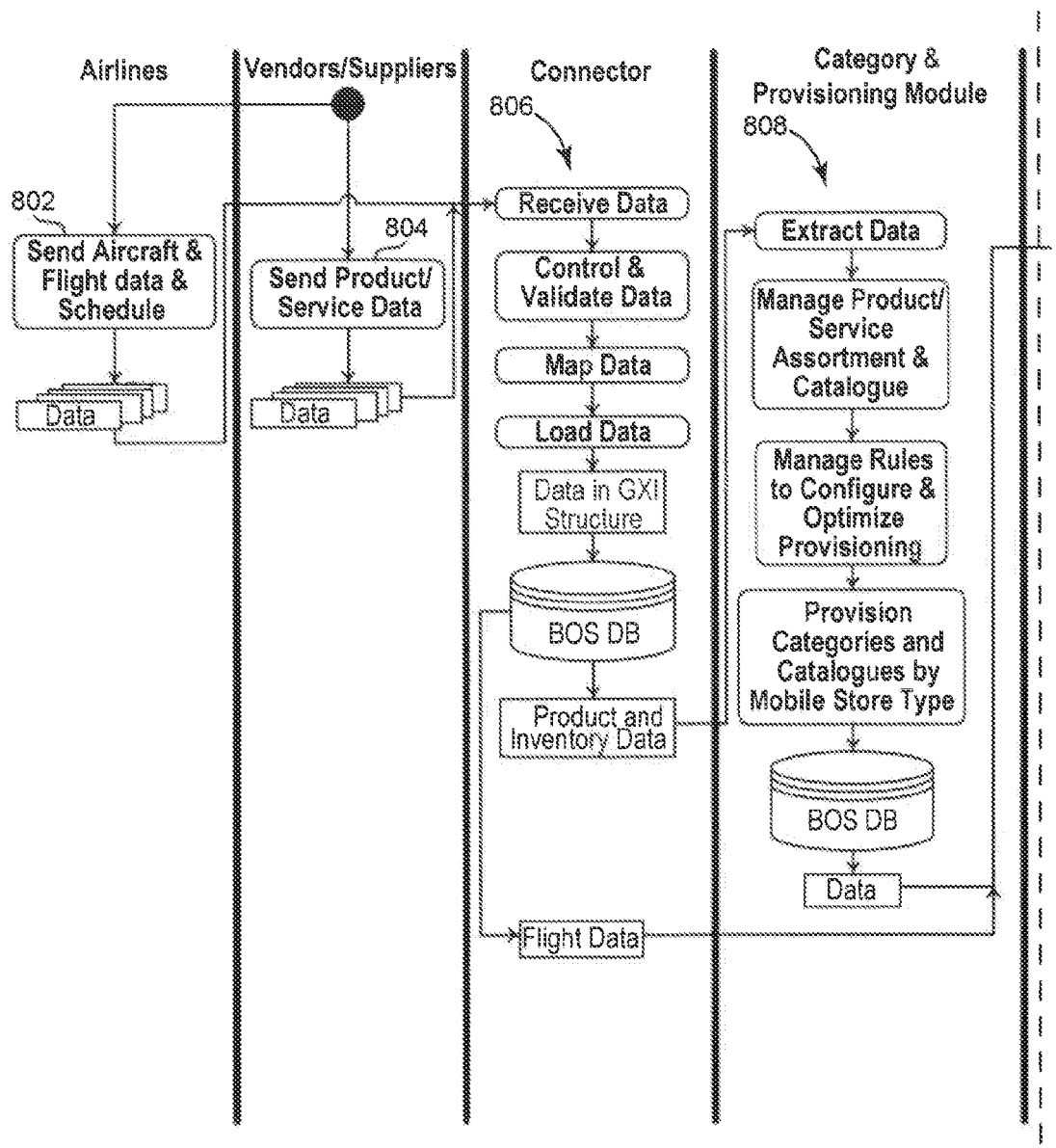
FIG. 8 is a flow diagram illustrating an example of system functionality according to one embodiment.
Figure 8B:
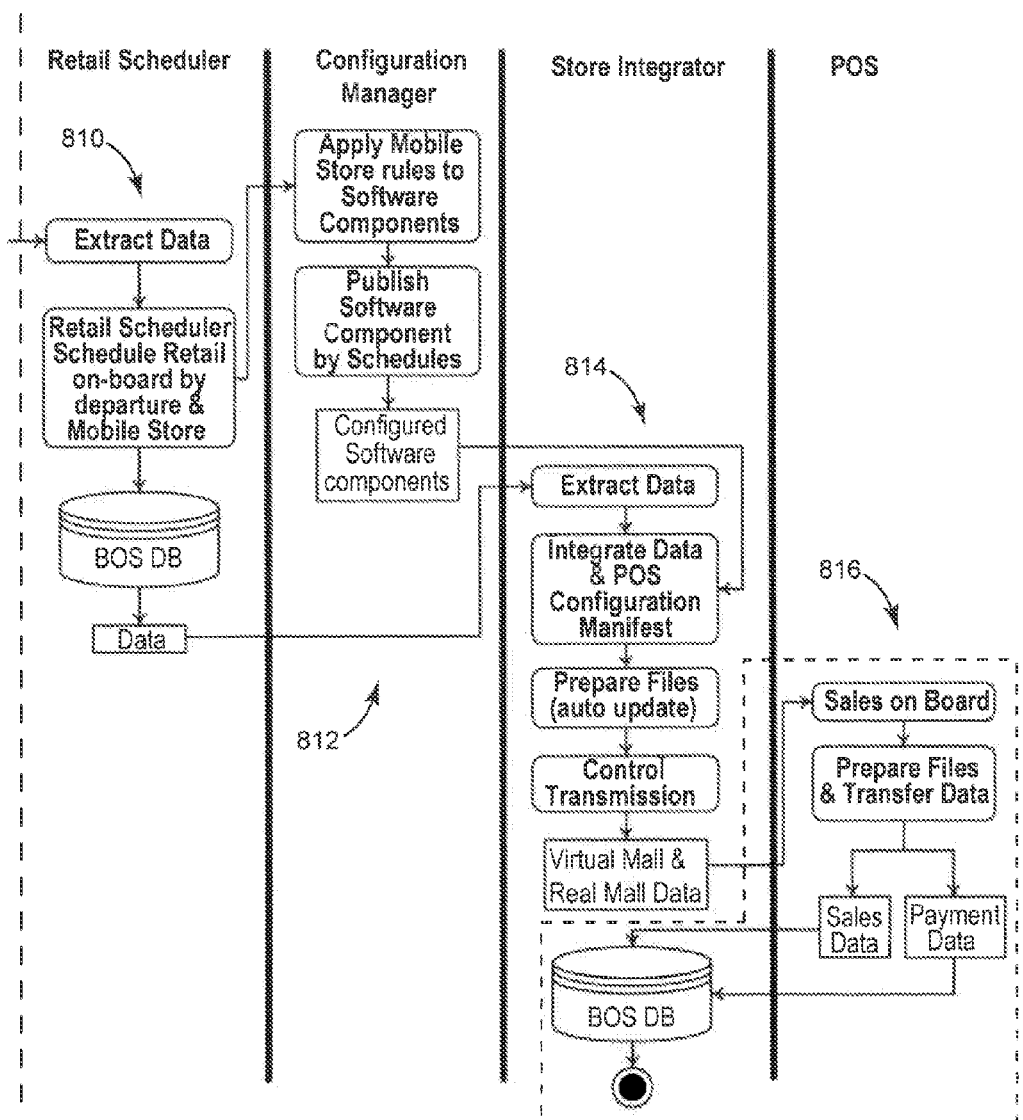

FIG. 8 is a flow diagram illustrating an example of the functionality of system 200. At 802, transportation data is sent by one or more airlines. At 804, product/service data is sent by vendors or suppliers. The operations indicated at 806 are performed by carrier connector 208 and vendor/supplier connectors 202*a/b* to receive that transportation and product/service data. the data mapping is performed to translate formats in which the data was received into a native format (GXI structure) for use by system 200. The translated data is stored in back office system database 306 to be accessed by the other modules as needed.

In the operations indicated at 808, the category and provisioning module 212 reads out the product and inventory data from BOS database 306, and performs the provisioning steps detailed above, and stored the results of that processing in BOS database 306. In the operations indicated at 810, the retail scheduler module 214 obtains the output of operations 808 along with the flight data stored by operations 806, and schedules the retail on board based on the departure and mobile store properties. At 814, mobile store integrator 218 obtains the configured software components and the results of operations 810, and takes steps to program the POS devices specifically for the mobile store instance. The operations indicated at 816 are sale and post-sale operations to complete the on-board transactions and transfer the sales and payment data that was generated as a result of the sales to the back office database 306 for back office processing.

Figure 9:
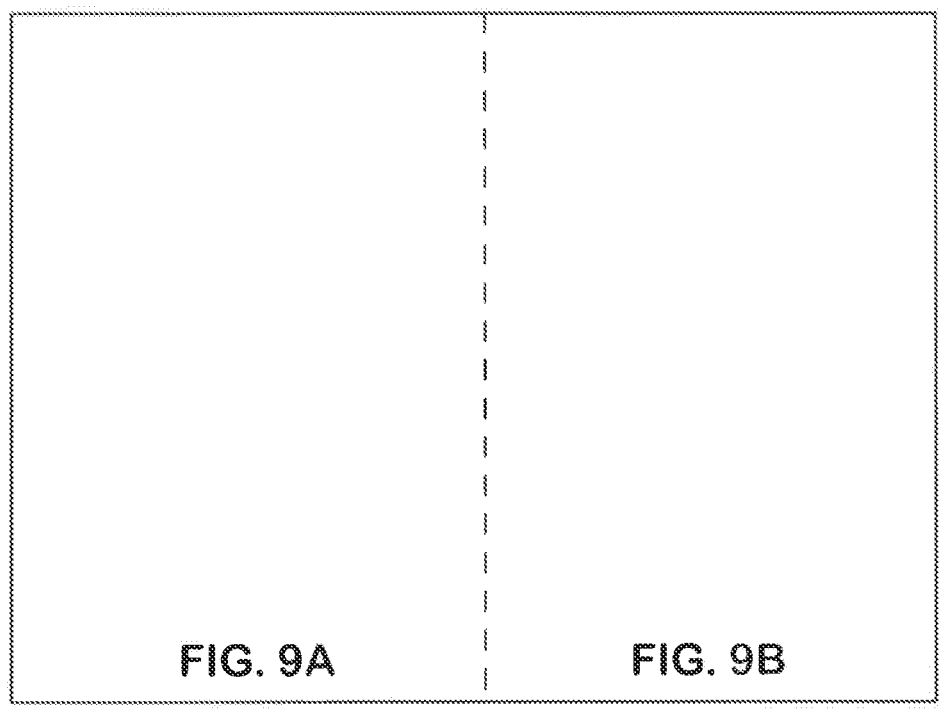
FIG. 9 is a flow diagram illustrating an example process according to one embodiment for on-board catalog sales of products sold by a vendor that is the merchant of record.
Figure 9A:
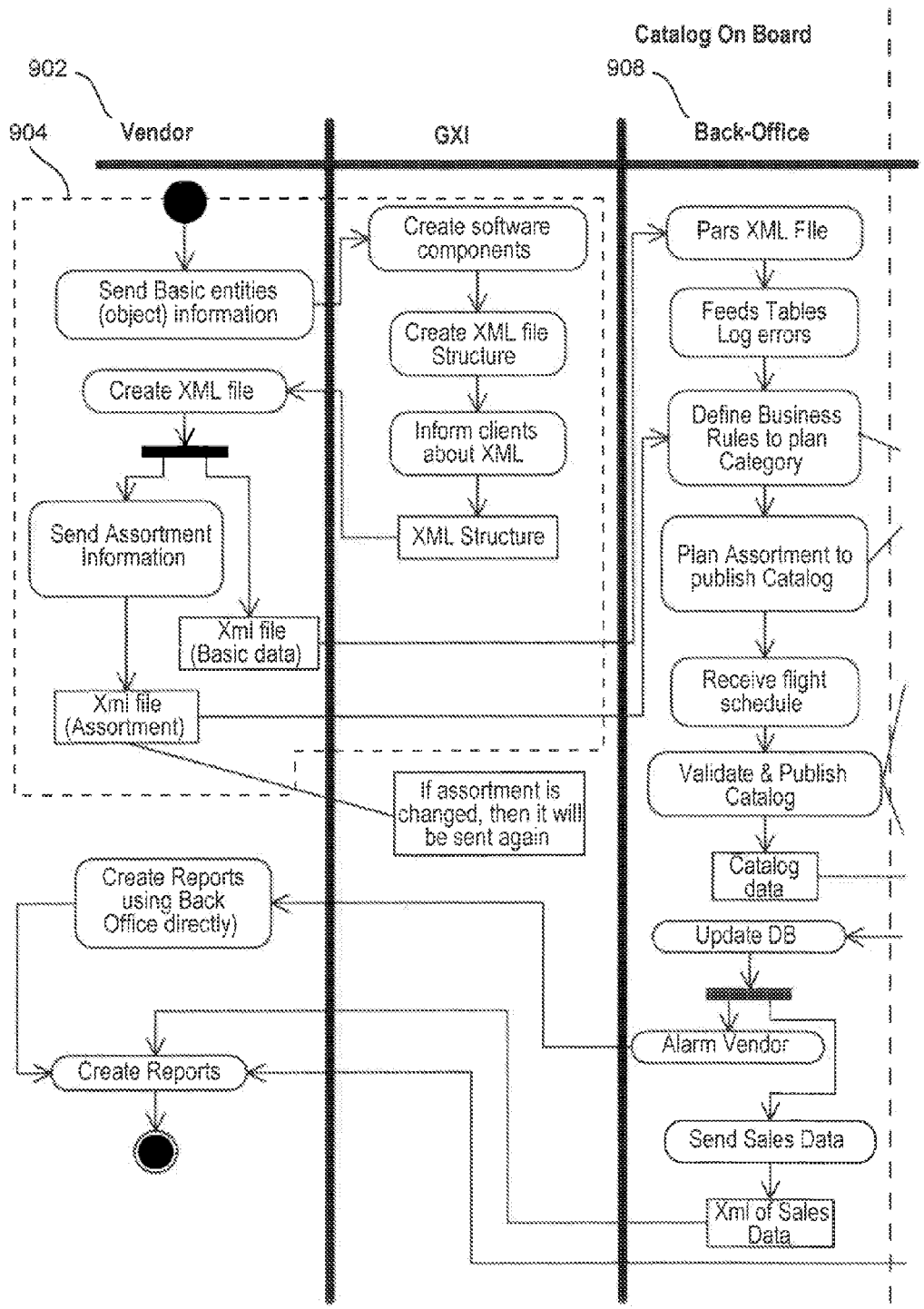
Figure 9B:
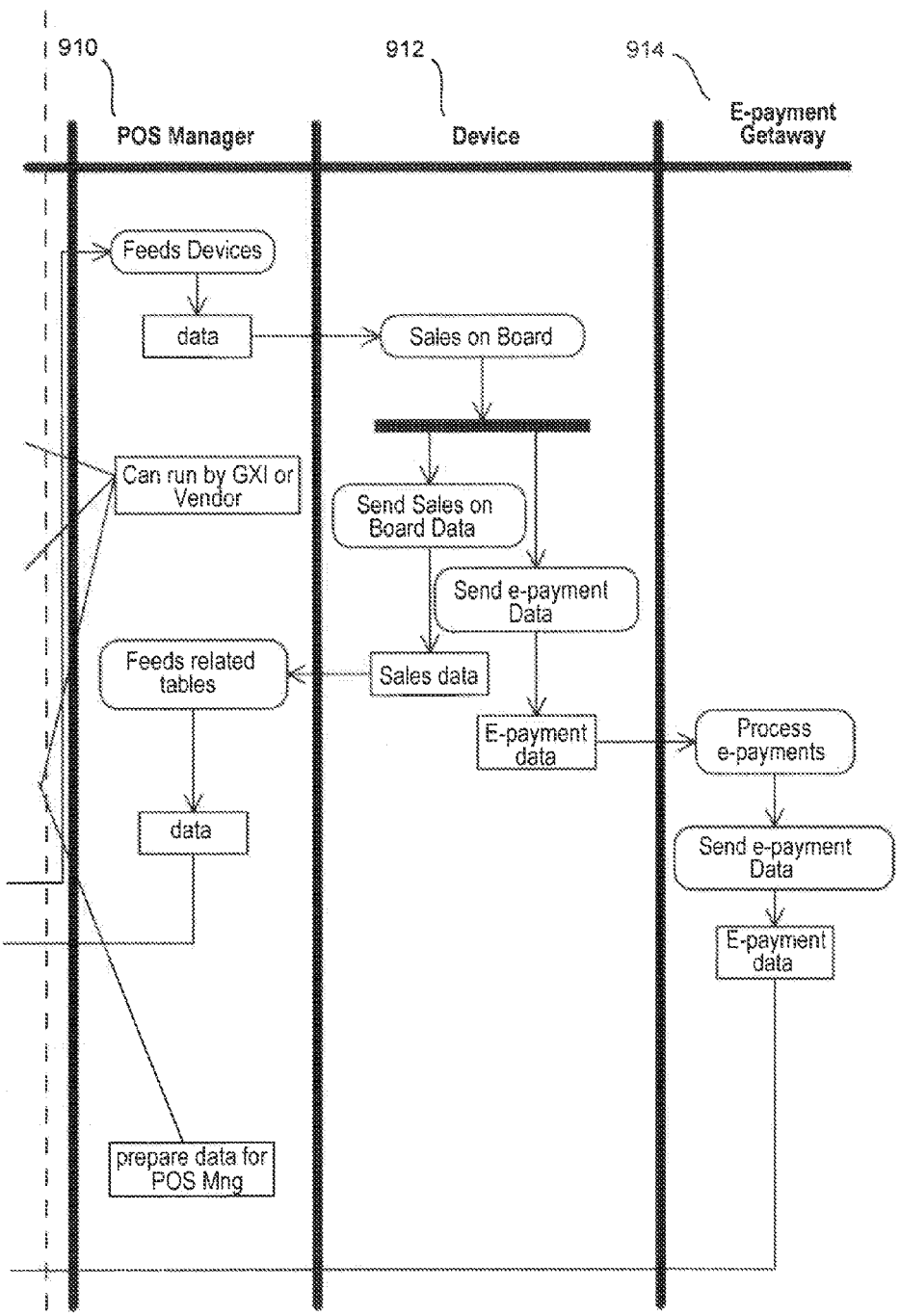

FIG. 9 is a flow diagram illustrating an example process for on-board catalog sales of products sold by vendor 902, which is the merchant of record. Operations 904 include an exchange of information between the operator 906 of the mobile retail platform and vendor 902 in which a XML structure for product data is established. The product data in the established format is sent to back office 908 for provisioning. The catalog data generated in by back office 908 is read by POS manager 910, which proceeds to program the POS devices 912.

POS devices 912 conduct their sales activity on board the flight, and the resulting sales data is read back by POS manager 910, which updates the back office database. That sales data, in turn, is processed and reported back to the vendor 902. The electronic payment data resulting from the sales activity is sent to E-payment gateway 914 for processing and payment reconciliation, and reporting back to the vendor 902.

Figure 10:
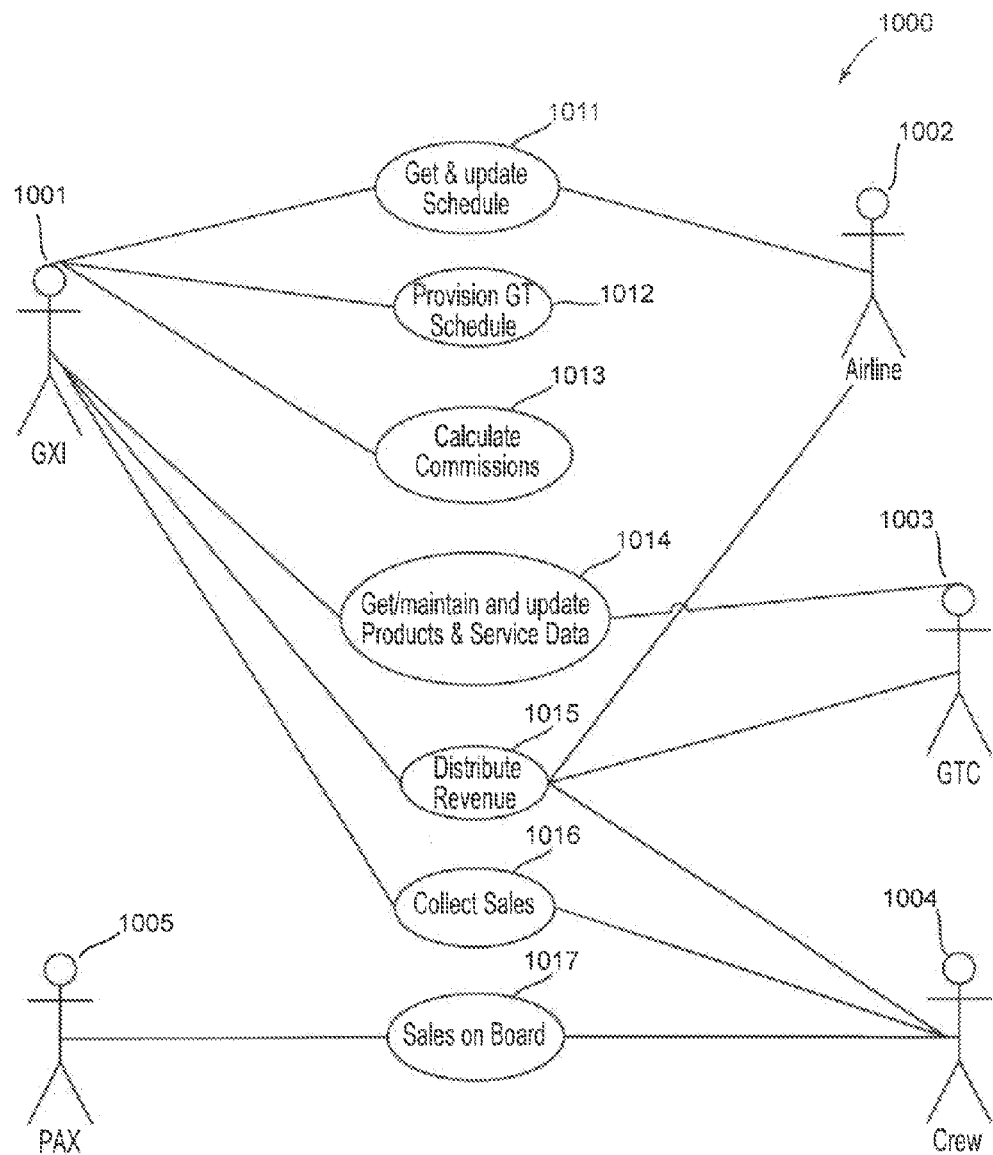
FIG. 10 is a flow diagram depicting a process flow according to one embodiment.

FIG. 10 is a flow diagram depicting a process flow 1000 according to one embodiment. As shown, flow 1000 depicts the interchange between one or more operators (GXI) 1001 of system 200, one or more airlines 1002, one or more vendors of products and/or services (ground transport center-GTC) 1003, on-flight staff 1004, and one or more airline flight passengers/customers (PAX) 1005.

At 1011, schedules of one or more flights are acquired. The schedule may include information such as airline, flight departure time, flight arrival time, airplane model, ticket type (first, business, economy class) connecting flight(s), flight leg destination/departure location and/or airport, final destination location and/or estimated arrival time, and other relevant flight specific information. The flight schedule information may be received directly from one or more airline providers 1002, such as directly from one or more online scheduling/reservation programs. The flight schedule information may be stored and/or updated by system 200 operator 1001. Flight information may further be updated as flight schedules change.

At 1012, one or more goods and/or services are provisioned by system 200 for presentation to a passenger 1005 via a specific mobile retail environment. The one or more goods and/or services may be provisioned based upon the one or more flight schedules acquired at 1011. Hotels, attractions, or events may be presented consistent with one or more arrival destinations indicated by flight schedules. Flight specific in-flight goods and/or services may be determined and presented to passenger 1005, for example available entertainment on a particular airplane model, or food and beverages available on a particular airline or flight.

At 1013, one or more commissions related to goods and/or services may be calculated by system 200. The one or more commissions may be calculated once a set of available goods and/or services to be presented to a passenger by system 200 are determined. The one or more commissions may instead be calculated for goods and/or services prior to determining a set of goods and/or services to be presented. The one or more commissions may also be calculated during or after a transaction to purchase goods and/or services.

As depicted, system 200 may be adapted to enable one or more commissions to be provided to system operator 200, airline 1002, vendors 1003, or flight staff 1004. For example, vendors 1003 may provide a sales incentive to airline 1002 or flight staff 1004 in the form of payment for sales acquired. The one or more commissions may be calculated and provided based on previously defined agreements regarding participants 1001-1004. System 200 may be adapted to enable flight-specific commissions. For example, one or more flights may be pre-selected as qualifying for flight staff or airline incentive commissions.

At 1014, products and/or services data are acquired and maintained. Acquiring products and/or services data may include acquiring data regarding all products and/or services available to system 200 operator 1001. Acquiring products and/or services data may include acquiring data relating to all products and/or services available for a particular flight or grouping of flights. For example, if certain products/services are only available on particular types of aircraft, or en-route to a particular destination, such data may be acquired in a flight-specific fashion.

Acquiring products and/or services data may include determining what products and/or services should be presented to a passenger by system 200. For example, acquiring such data may include determining what types of food will be made available in-flight, or what attractions, lodgings, activities, or other location specific information to provide to a passenger 1005 via system 200. Product and/or services data may include type, available quantity, price, and how/where to acquire a purchased product or service (on flight, pick up at airport, mail, delivery . . . etc.)

Also at 1014, products and/or services data may be updated. For example, availability of products and/or services may be updated based on supply levels. Products and/or services data may be updated based on flight schedule information acquired at 1011. For example, when a passenger 1005 flight changes, such if as a flight was missed or cancelled, or a flight schedule was delayed, or if a flight is modified to take a different aircraft, product and/or services data may be updated accordingly consistent with goods and/or services available on a particular flight or aircraft.

At 1015, one or more revenues from the sale of products and/or services via system 200 may be distributed. The one or more revenues may be distributed after a sale of goods and/or services offered via system 200 are consummated. The one or more revenues may be distributed upon arrival at a destination.

Revenues may be distributed in a variety of formats. For example, system operator 1001 may be adapted to communicate with one or more vendors, airlines, and/or banking institutions to acquire and/or transfer funds. An indication of received funds may be communicated to one or more banking institutions, and a corresponding revenue payment may be distributed to one or more of system operator 1001, airline 1002, vendor 1003, or even flight staff 1004 as necessary. For credit card, debit card, or other like methods of purchase, system 200 may be adapted to verify authenticity of a payment or funds available, and distribute revenue in accordance with verification.

At 1016, sales, or payment for goods and/or services, are collected. The sales may be collected by interaction with a member of a flight crew 1004. Sales may be collected via hand-held unit XXX. Sales may also be collected based on one or more interactions with a seat back device. If a seat back device is equipped with a credit card magnetic reader, sales may be collected based on swiping a credit card. A seat back device may provide a user touch-based or other input enabling entry of a credit card, bank account, or other relevant financial transaction information used to complete a sale.

At 1017, system 200 is adapted to facilitate on-board sales. On-board sales are facilitated via passenger 1005 interaction with one or more of airline crew 1004. On board sales may further be facilitated via one or more seat back devices provided on an aircraft. On-board sales may be facilitated directly by system 200 presented to passenger 1005 via the one or more seat back devices. System 200 may also be adapted to communicate with one or more other systems to facilitate transactions via one or more seat back devices.

Figure 11:
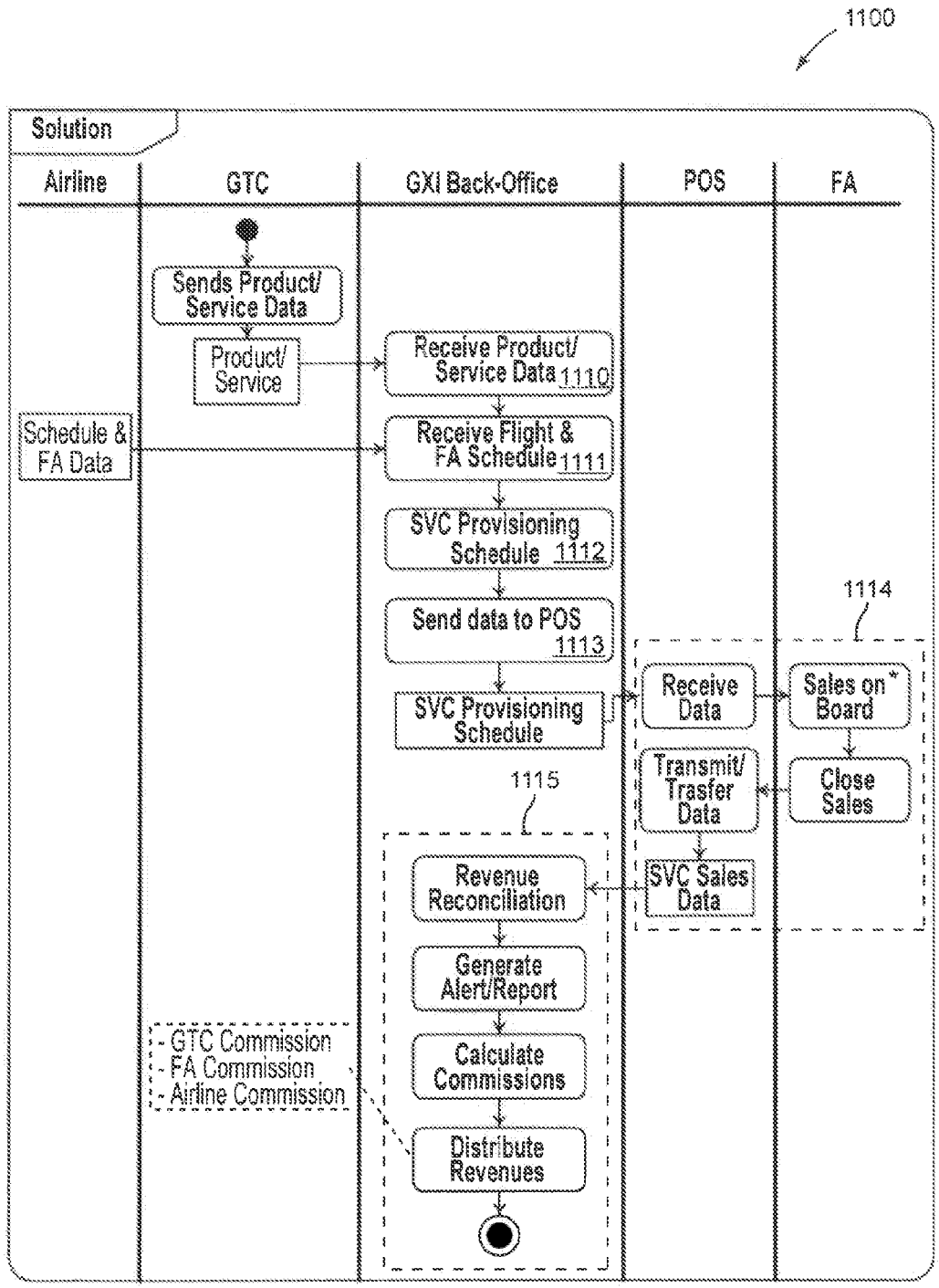
FIG. 11 is a flow diagram depicting a process flow according to one embodiment.

FIG. 11 is a flow diagram depicting a process flow 1000 according to various aspects of the invention described herein. At 1110, product and/or service data is received by system 200 from one or more vendors (GTC). The product and/or service data may include available products and/or services including flight/destination specific information regarding the availability of products and/or services. At 1111, flight and/or flight attendant data may be received by system 200. Flight data may include information relating to flight departure and arrival times, multiple legs of a trip, airline, aircraft type, departure and arrival locations, and other like information. Flight attendant information may include one or more indications of flight attendants on a particular flight. The one or more indications may include an indication of flight attendant identification, such as a number indicating an identity of one or more flight attendants. The one or more indications may further include information relating to flight attendant training, such as whether or not a particular flight attendant has been trained to operate components of system 200.

At 1112, a provisioning schedule may be created. The provisioning schedule may determine goods and/or services to be provided to one or more passengers via a mobile retail marketplace. The provisioning schedule may be based at least in part on product/service data received at 1110 and flight and FA scheduling information received at 1111.

At 1113, the provisioning schedule information may be sent to POS. The provisioning schedule information may include products and/or services to be offered for a particular flight or grouping of flights. The provisioning schedule information may further include products and/or services to be offered for a particular customer. Even further, the provisioning schedule information may include products and/or services to be provided to a particular customer on a particular flight. For example, different products and/or services may be offered to a particular customer for a first leg of a trip than a second leg of the trip.

At 1114, one or more on-board systems such as described herein are adapted to receive provisioning schedule information in order to facilitate providing a mobile retail environment to one or more passengers. In addition, transactions may be facilitated according to various means as described herein. At 1115, back-end processing of in-flight transactions may be processed. Back end-processing may include the reconciliation of revenue payments to airlines, flight attendants, vendors, system 200 operator, or others by various means as described herein. The back-end processing may further include the calculation of generation of revenue and/or commission reports. The back-end processing may further facilitate payment of revenues to airlines, flight attendants, vendors, system 200 operator, or others.

Figure 12:
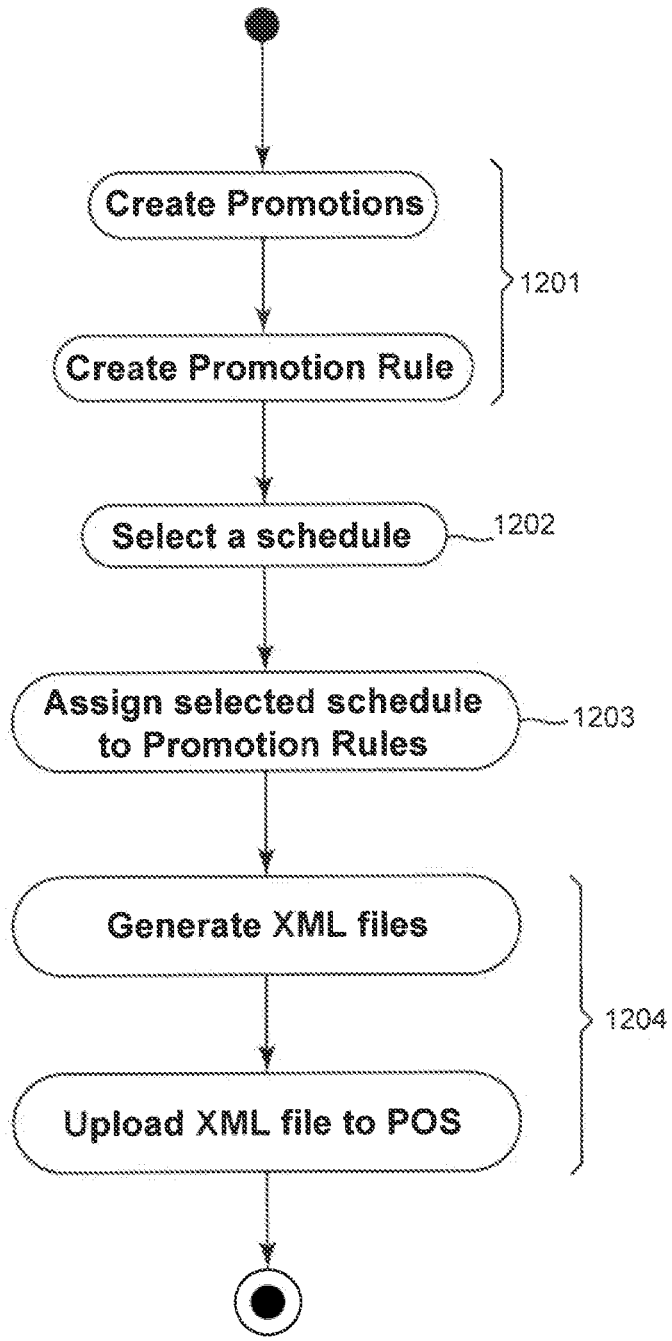
FIG. 12 is a flow diagram depicting a process flow for providing promotions according to one embodiment.

FIG. 12 is a flow diagram depicting a process flow for providing promotions according to one embodiment. At 1201, promotions may be created, including promotion rules. Promotions may be sales or combined offerings for products and/or services made available for purchase via a mobile retail environment. Promotions may also be incentive-based promotions for flight attendants or airlines. One or more promotional rules may define a particular promotion, and may include information such as what passengers or flight attendants a promotion is available to, what products and/or services are involved, and costs of products and/or services according to the promotion. At 1202, a promotion schedule may be selected. The promotion schedule may define a time period in which a promotion is valid. A promotion schedule may also define what flights a promotion may be available on. At 1203, the promotion schedule may be associated with the promotion rules. At 1204, one or more indications of information relating to one or more promotions may be generated and/or transmitted to POS. Such information may be generated and/or transmitted in XML format. One or more POS systems such as those described herein may be adapted to receive promotion information to enable facilitation of promotions via system 200.

Figure 13:
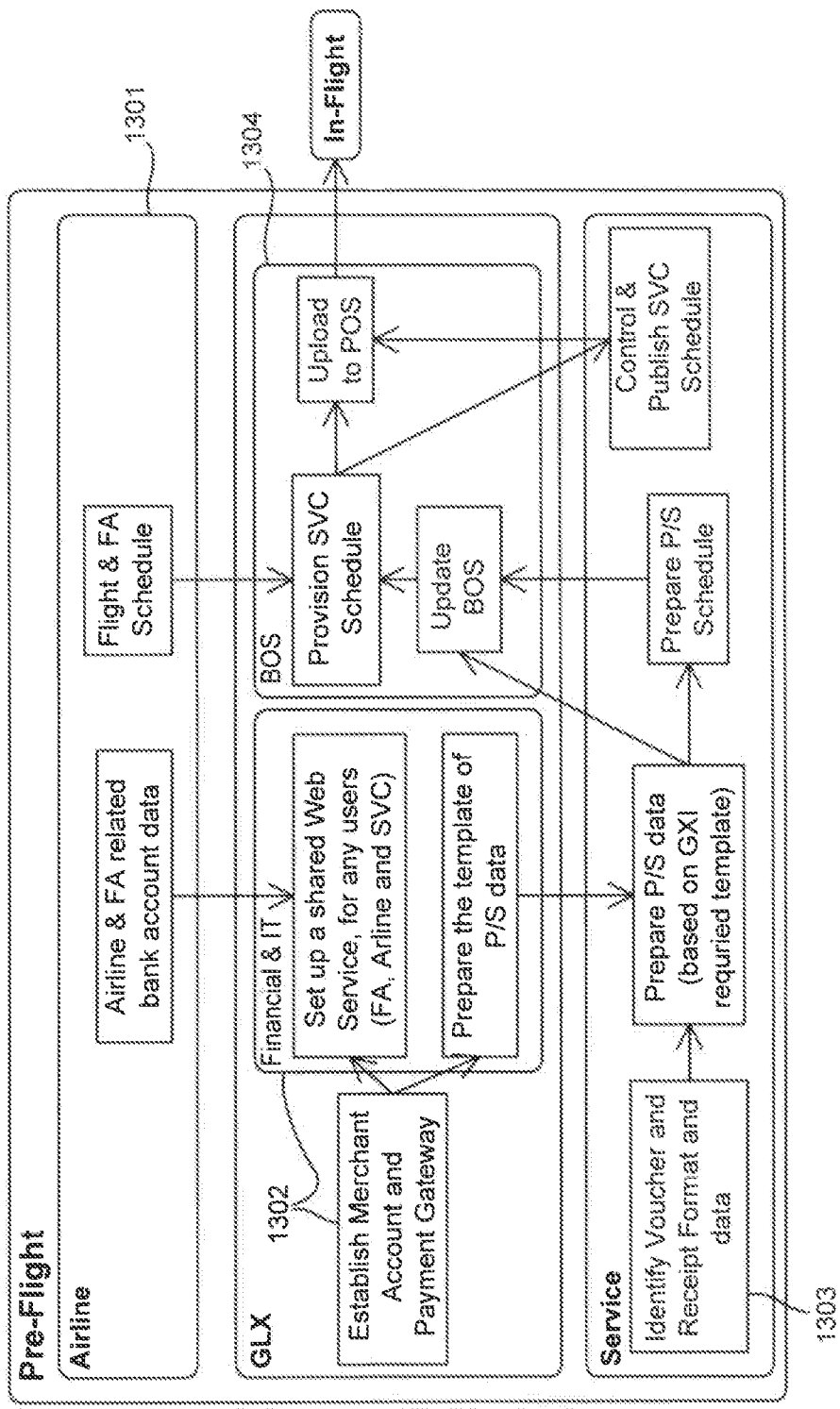
FIG. 13 is a block diagram depicting a pre-flight process flow according to one embodiment.

FIG. 13 is a block diagram depicting one embodiment of pre-flight functions of system 200. At 1301, one or more airlines may supply flight and flight attendant scheduling information. The one or more airlines may also supply bank account information, including airline bank account information to enable the payment of revenue or commissions the airlines. For purposes of commissions, flight attendant bank account information may also be provided.

At 1302, system 200 operator may establish an account and/or payment gateway to enable payment of commissions and/or fees. Communications between airlines, flight attendants, vendors, system 200 and/or operators of system 100 may be facilitated with one or more shared web services. A template for product and/or service data may further be created.

At 1303, various information may be prepared, including the identification of voucher and receipt formats, and the preparation of product/services data based on the template created at 1302. The product/service data may be utilized to create a product/service schedule indicating available products and/or services for a particular flight or grouping of flights.

The product/service schedule may be provisioned based on flight specific information. The schedule may be provisioned based on up to date information regarding flights. The flight specific information may also be reviewed to determine one or more mobile retail environments. Also at 1304, the product/service schedule and related information may be uploaded to a point of sale device provided to one or more passengers in the form of a mobile retail environment.

Figure 14:
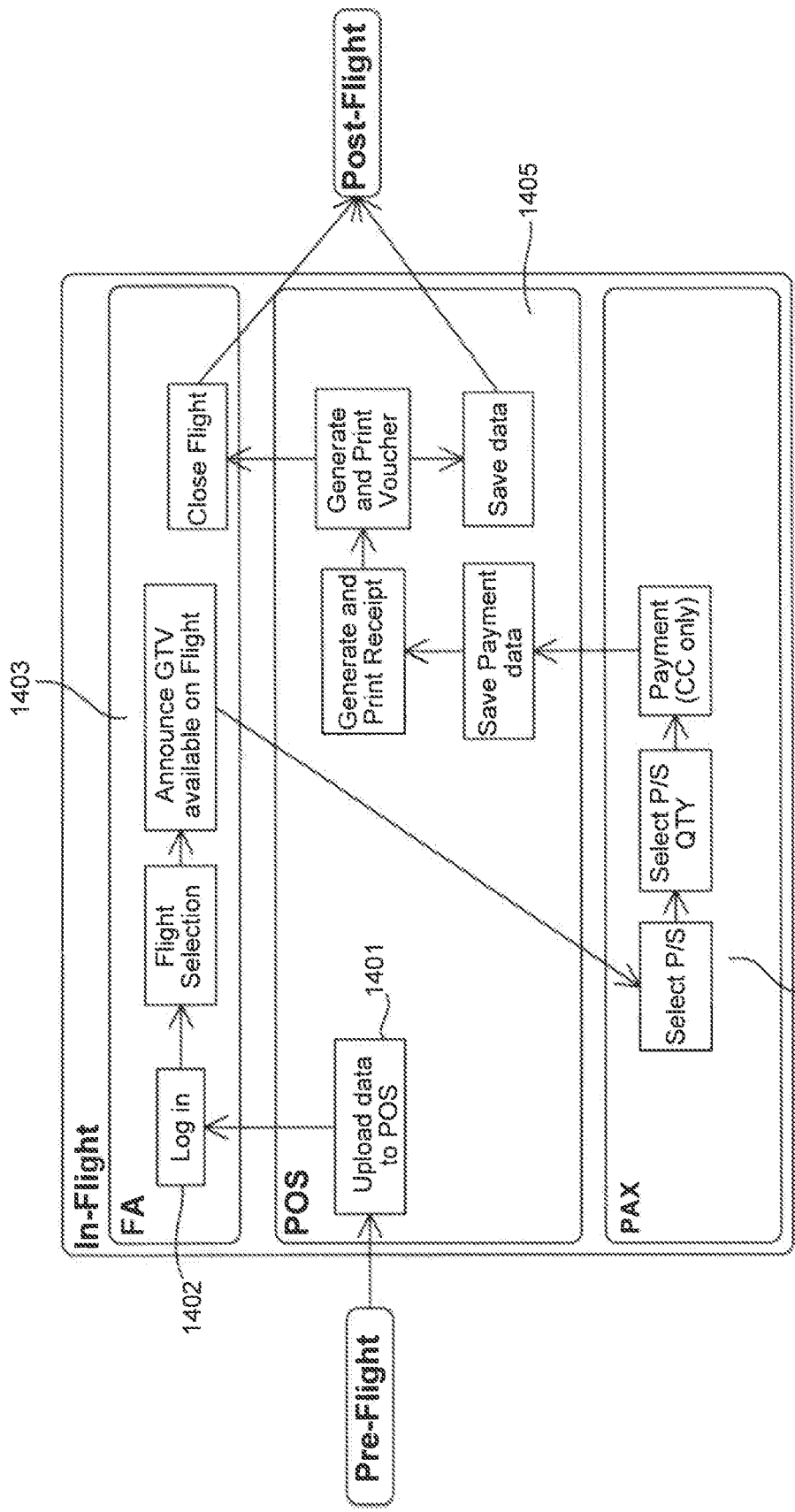
FIG. 14 is a block diagram depicting an in flight process flow according to one embodiment.

FIG. 14 is a block diagram depicting an in flight process flow according to one embodiment. At 1401, various data is uploaded and/or stored in one or more POS devices located on a transportation vehicle, such as an aircraft. At 1402, a flight attendant may login to a POS system using a secure key or other uses. The flight attendant may be prompted to enter current flight info for verification or otherwise. At 1403, one or more ground transfer vehicles (GTV) may be indicated as available on the fight. At 1404, a passenger may select, from a mobile retail environment, one or more products and/or services for purchase. The passenger may select a quantity of the products and/or services, and may provide one or more means for payment, for example a credit card. At 1405, the payment may be processed. Processing the payment may include the saving of payment data and the generation of one or more receipts. For products and/or services provided for purchase in-flight but which are to be received elsewhere, one or more vouchers may be generated, printed, or otherwise supplied to a passenger. Data relating to the transaction may be saved.

Figure 15:
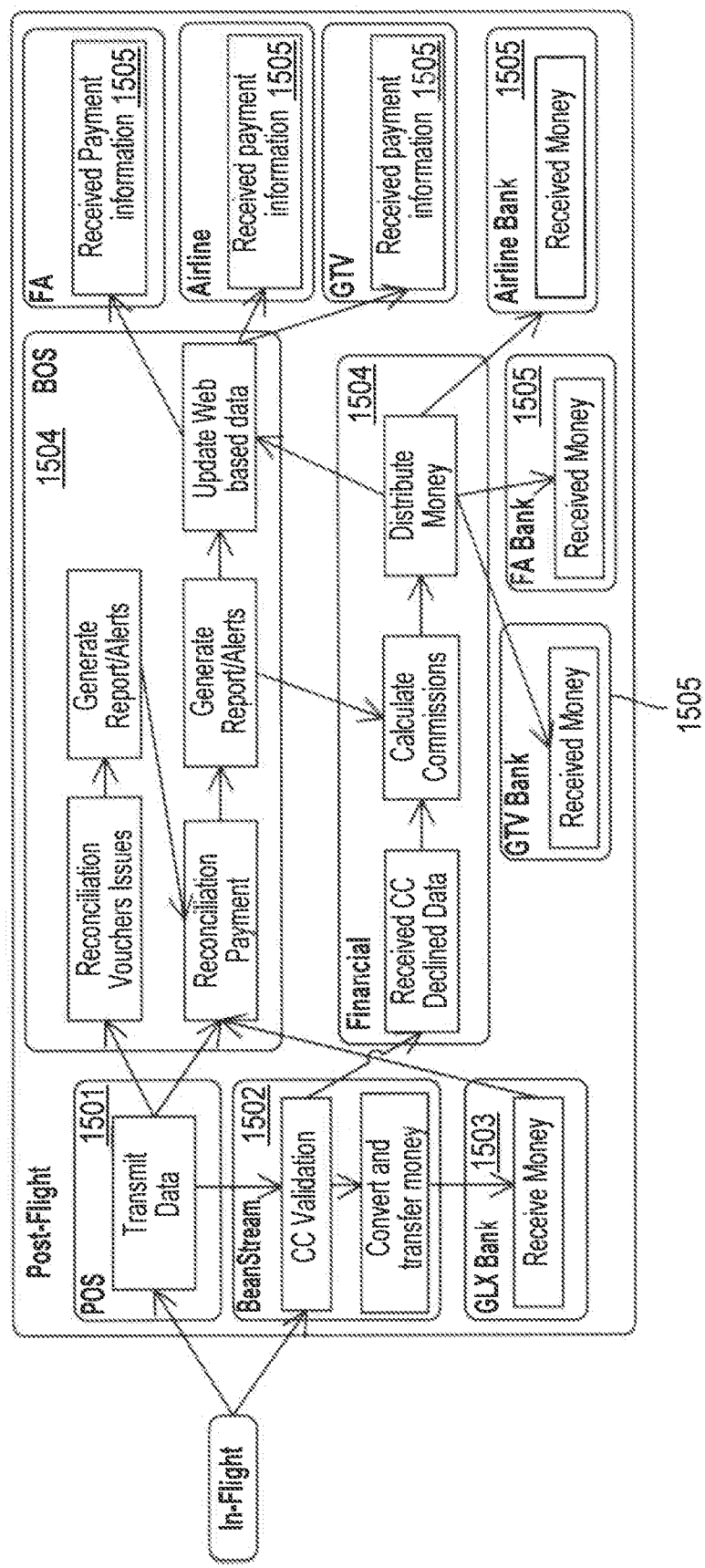
FIG. 15 is a block diagram depicting a post-flight process flow according to one embodiment.
Figure 16A:
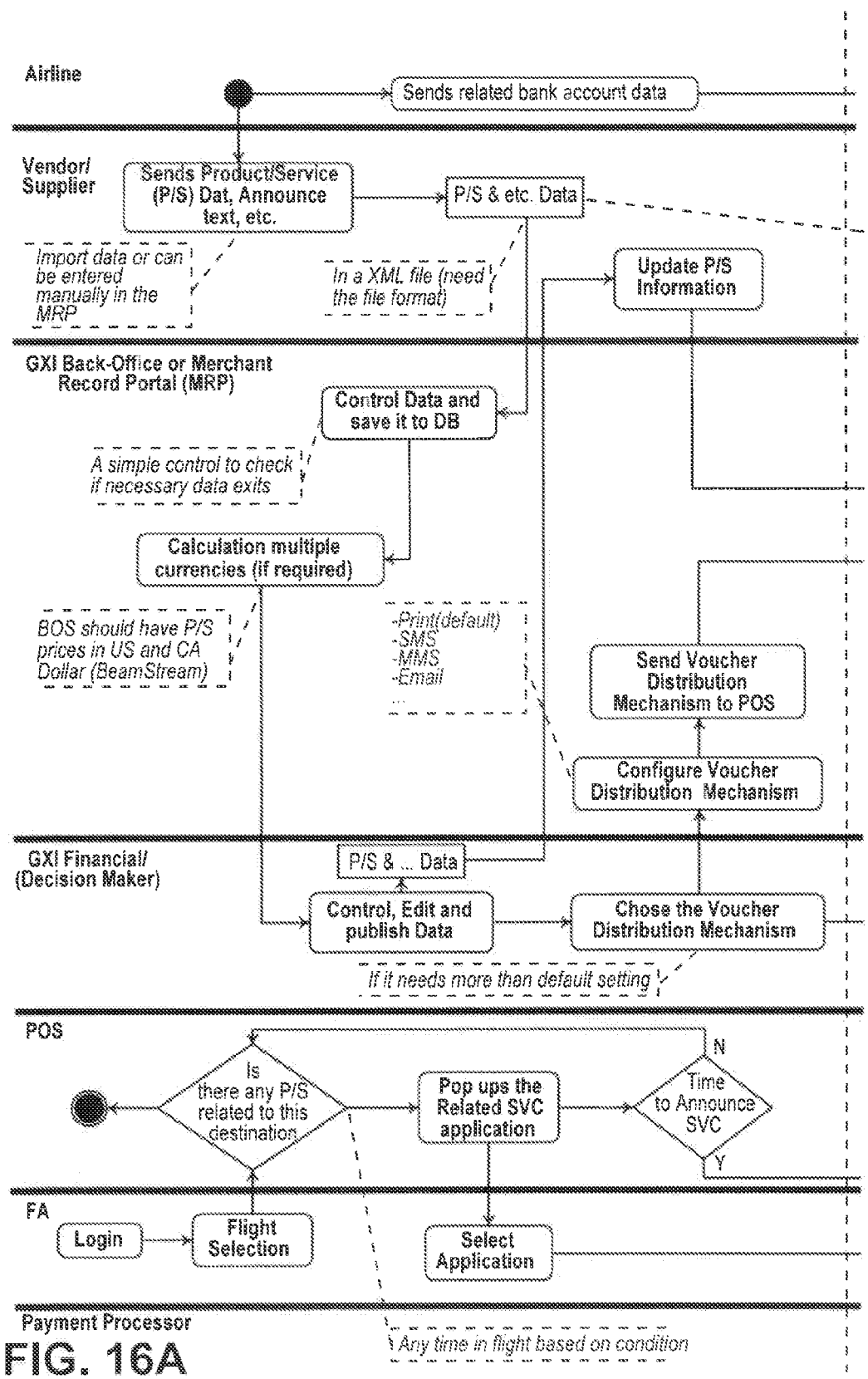
Figure 16B:
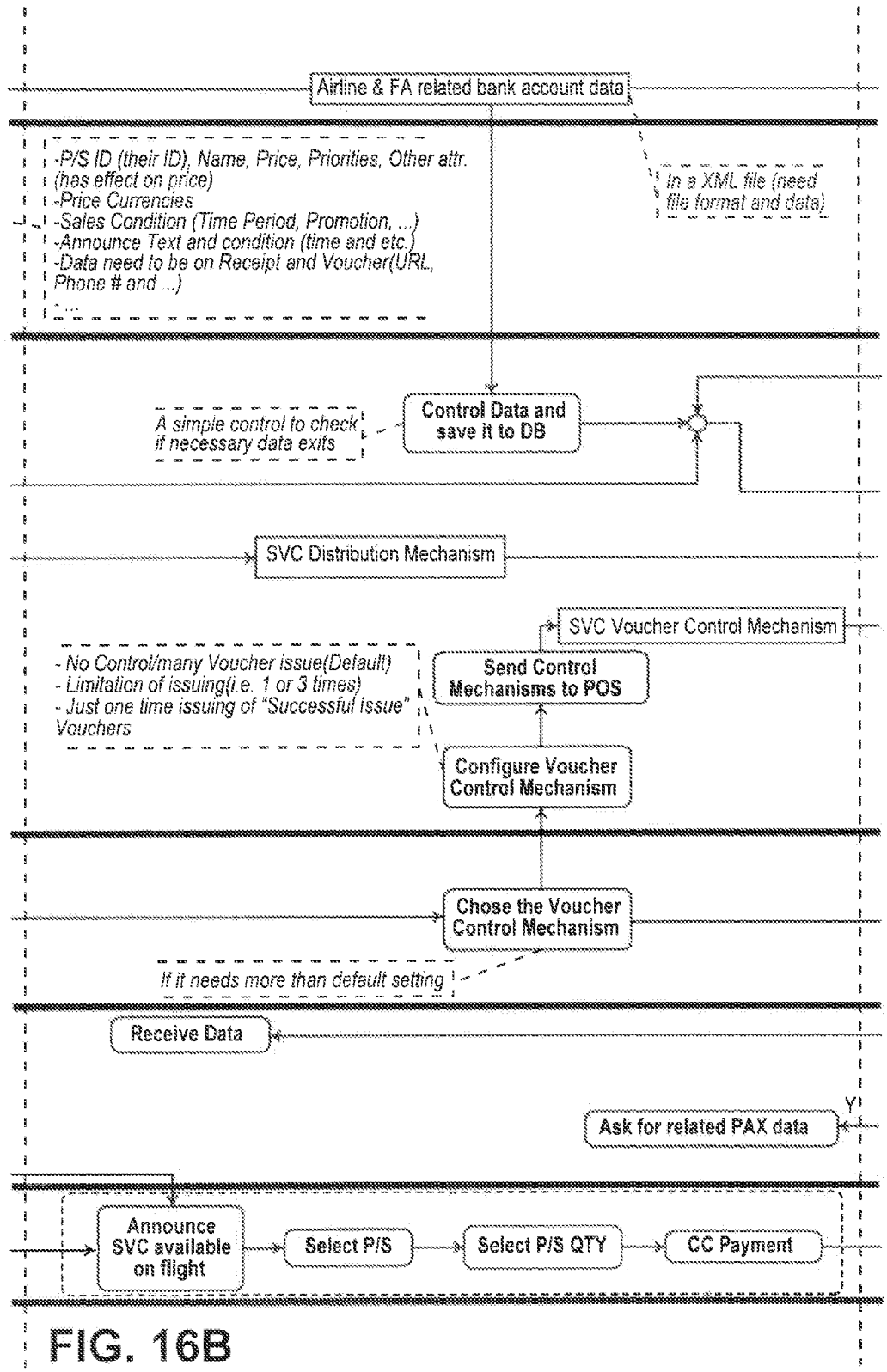
Figure 16C:
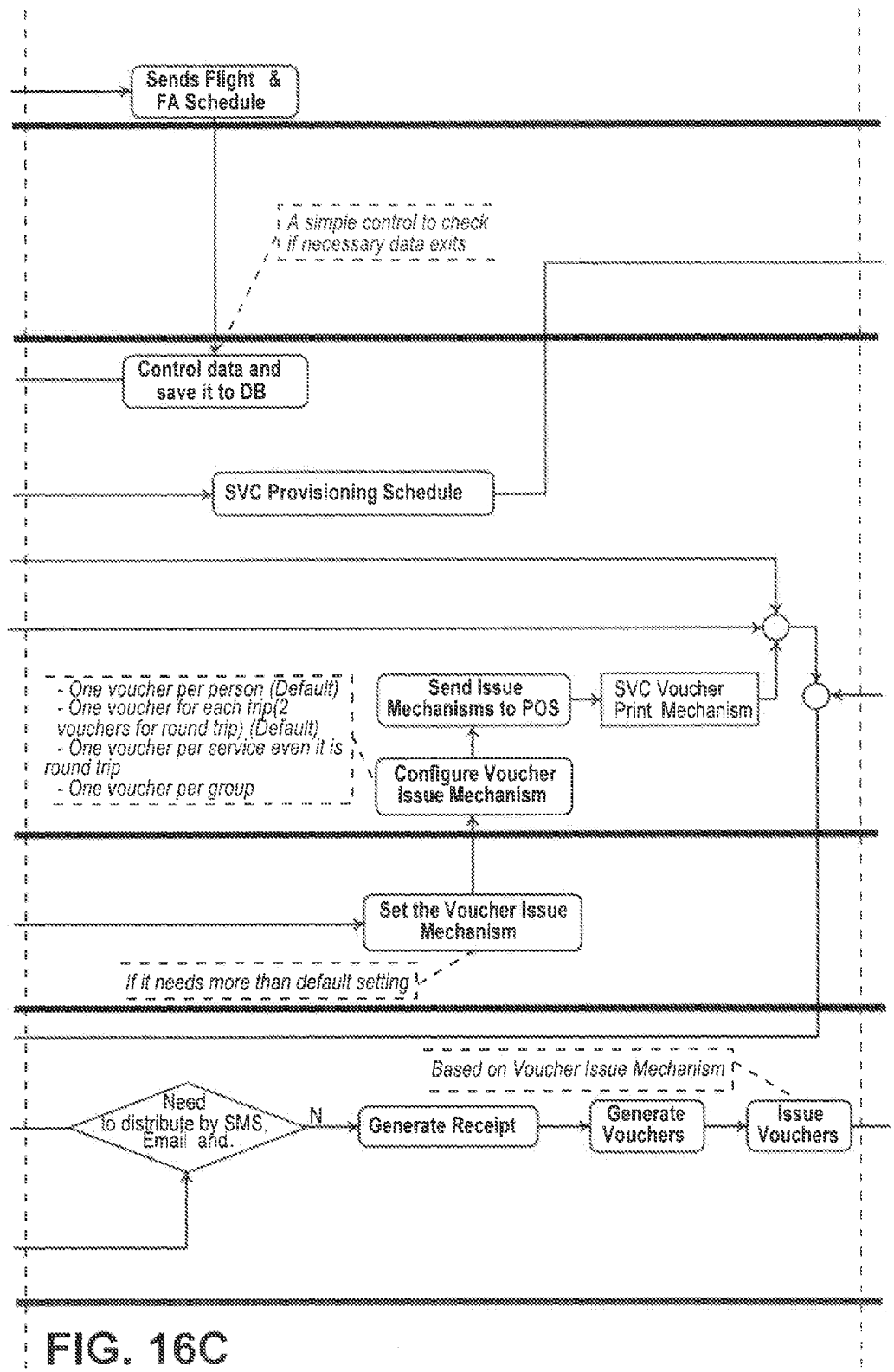
Figure 16D:
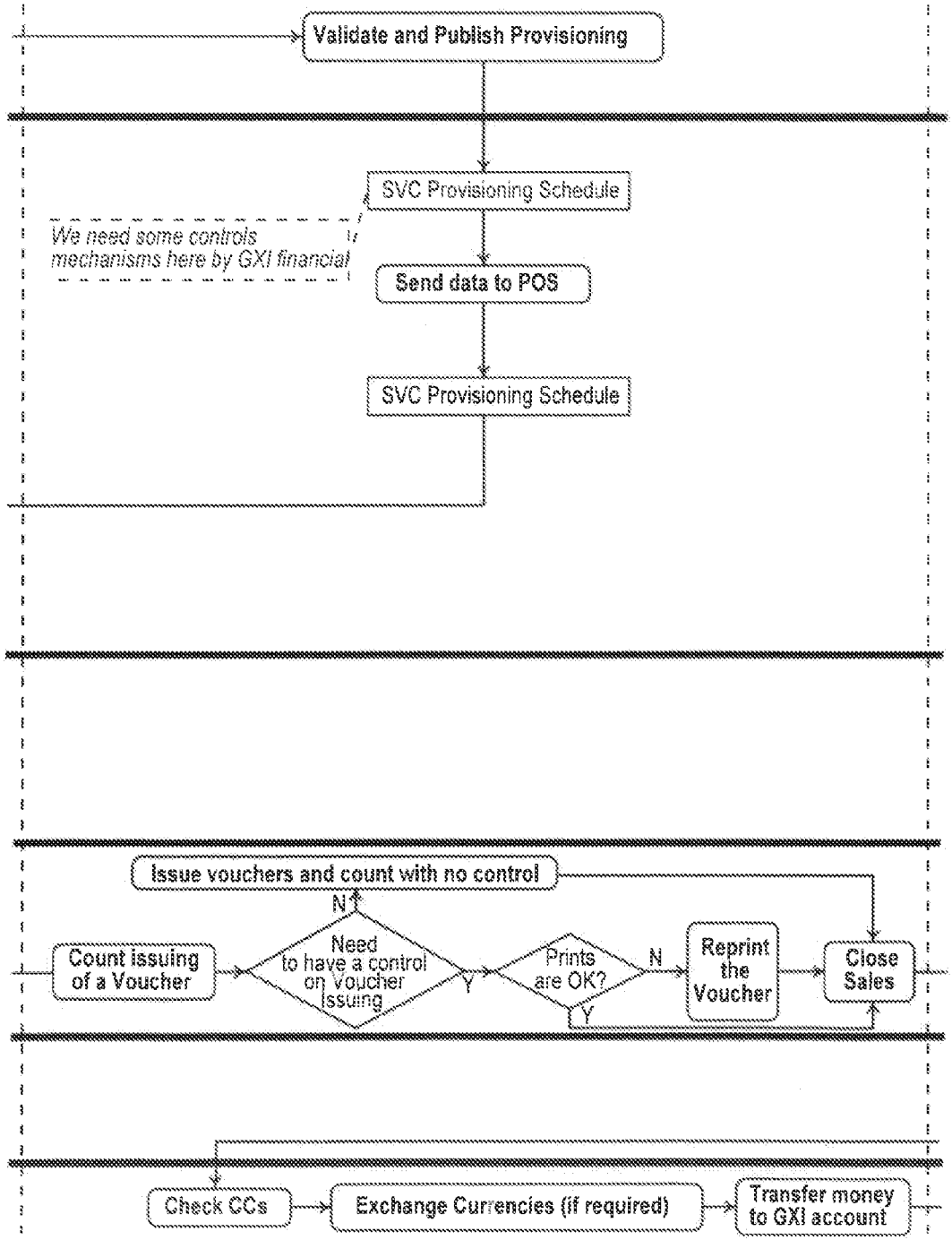
Figure 17A:
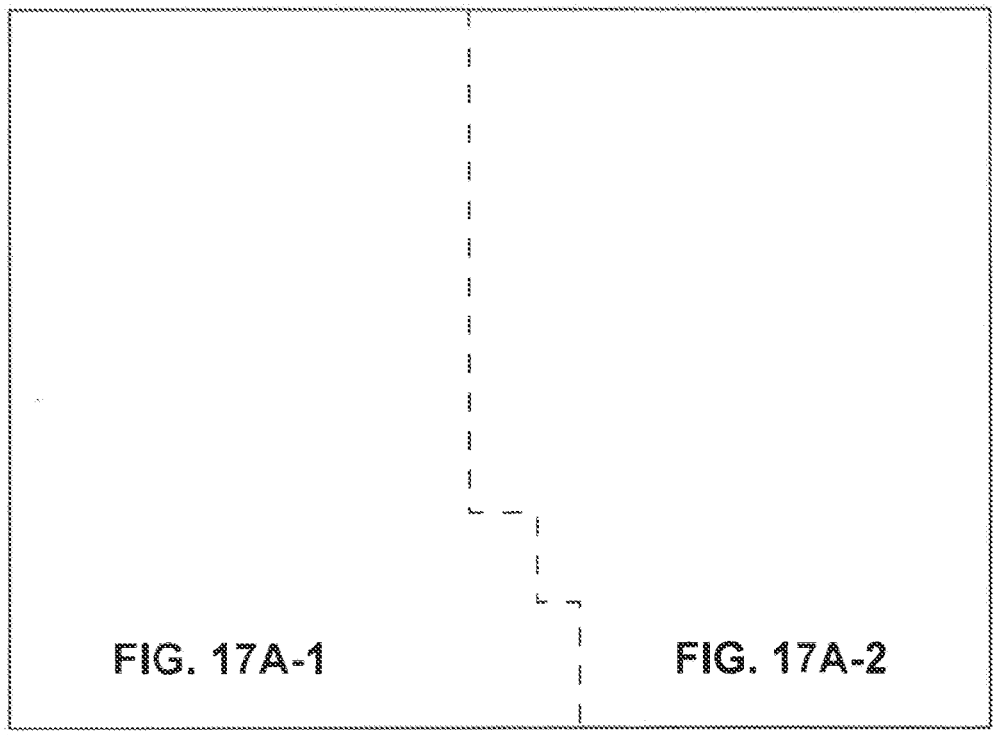
FIGS. 17A-D are a flow diagram depicting various aspects of POS transactions according to one embodiment.
Figures 1, 17A:
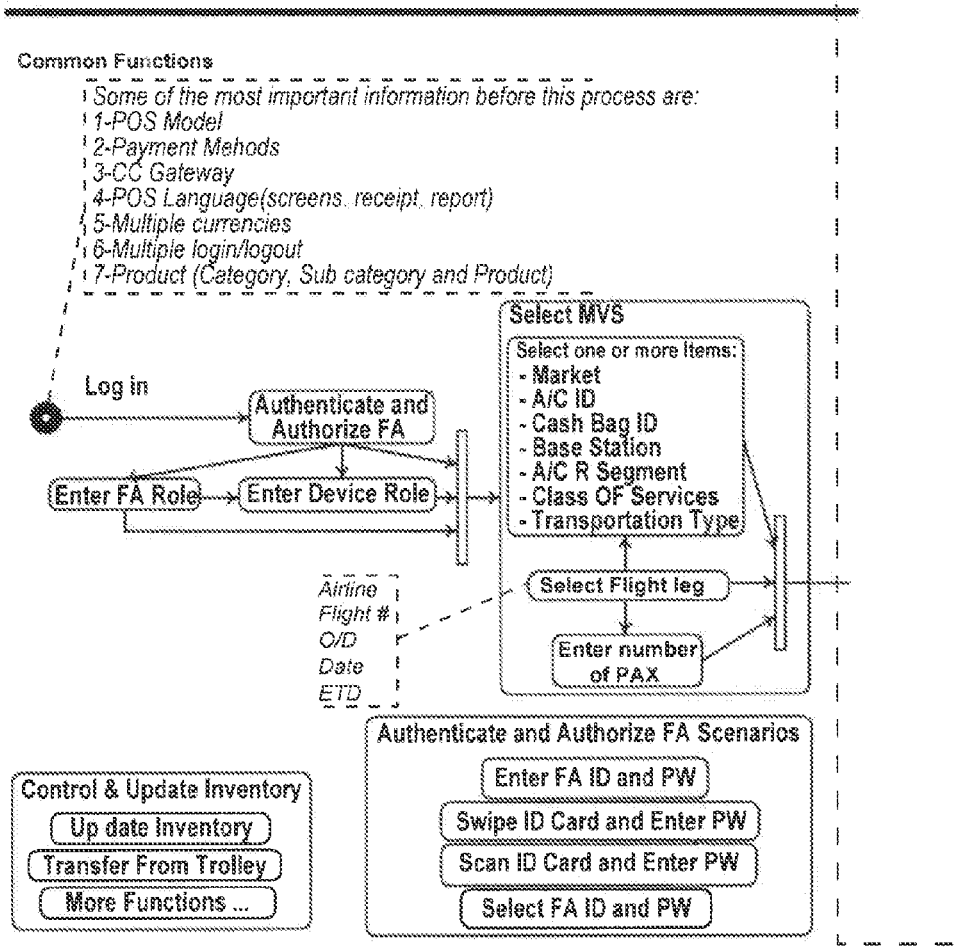
Figures 2, 17A:
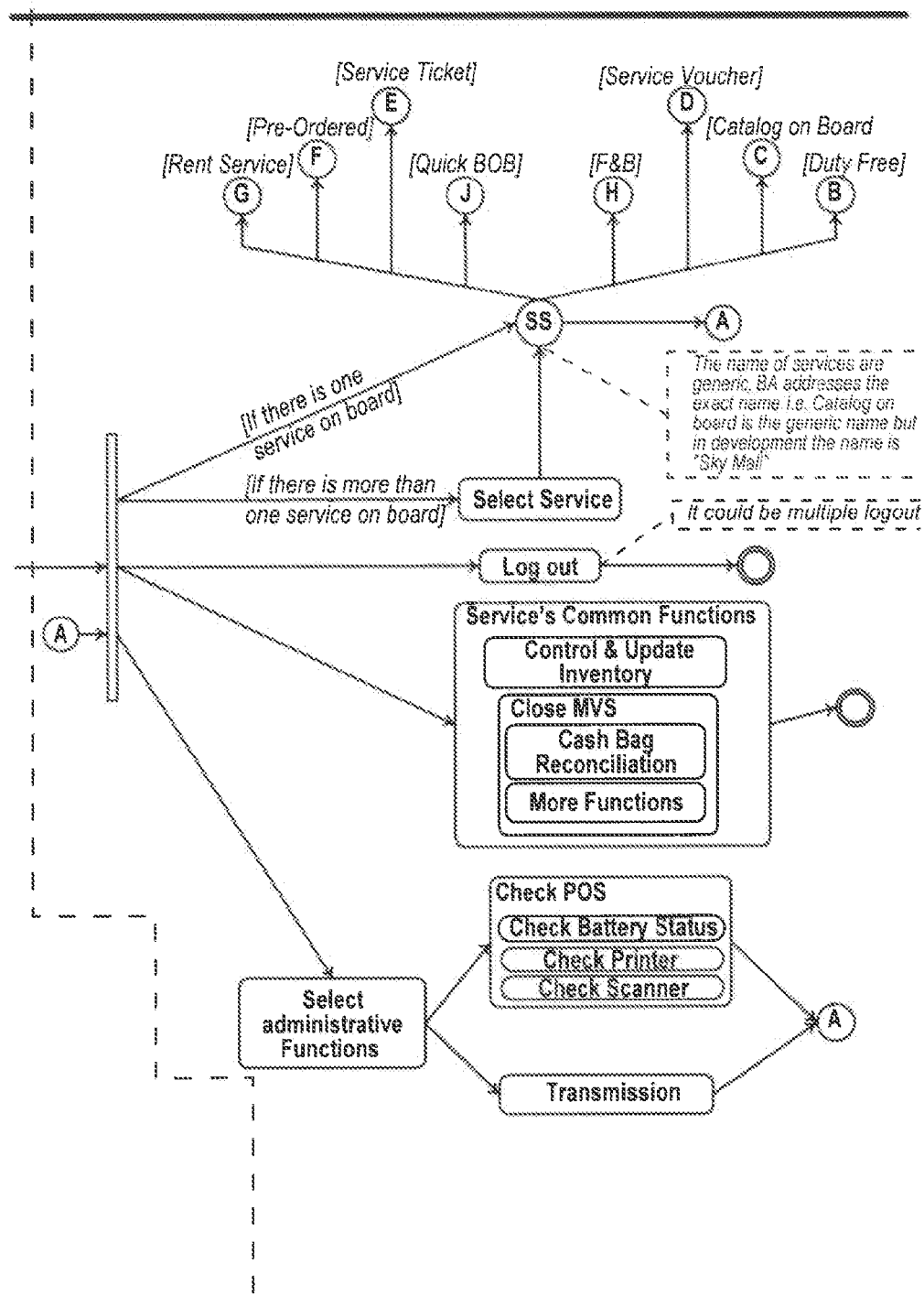
Figures 1, 17B:
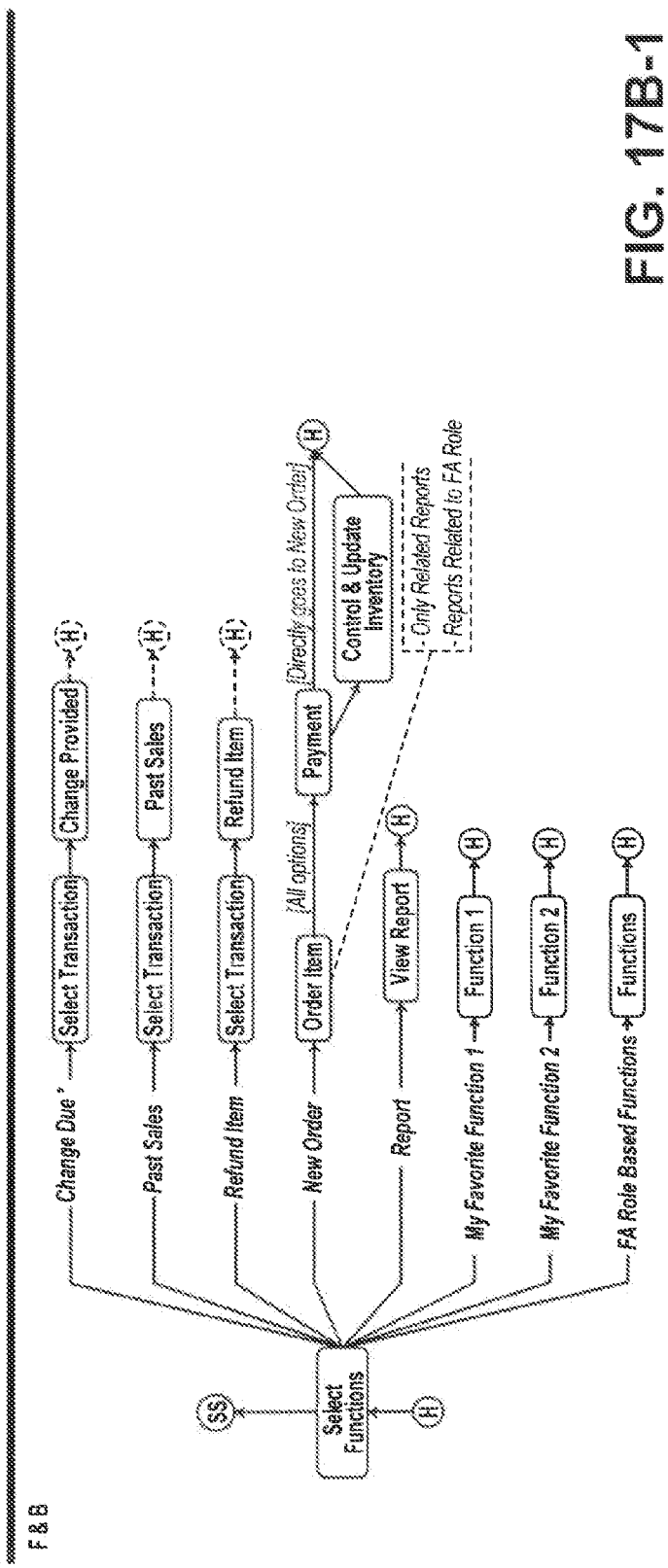
Figures 2, 17B:
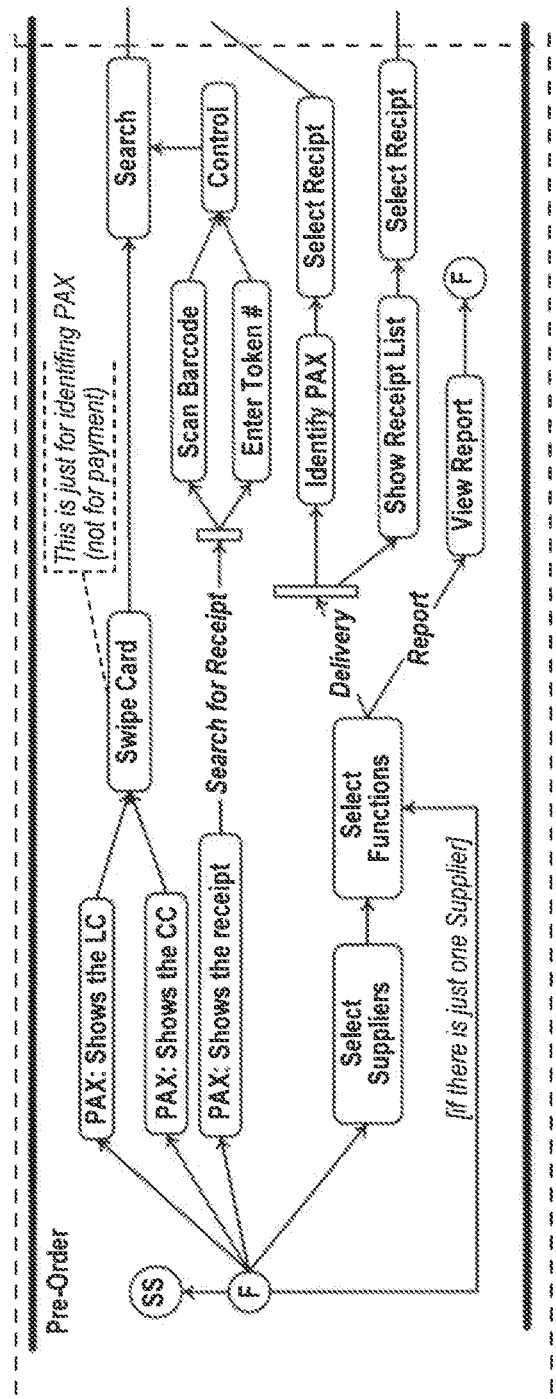
Figures 3, 17B:
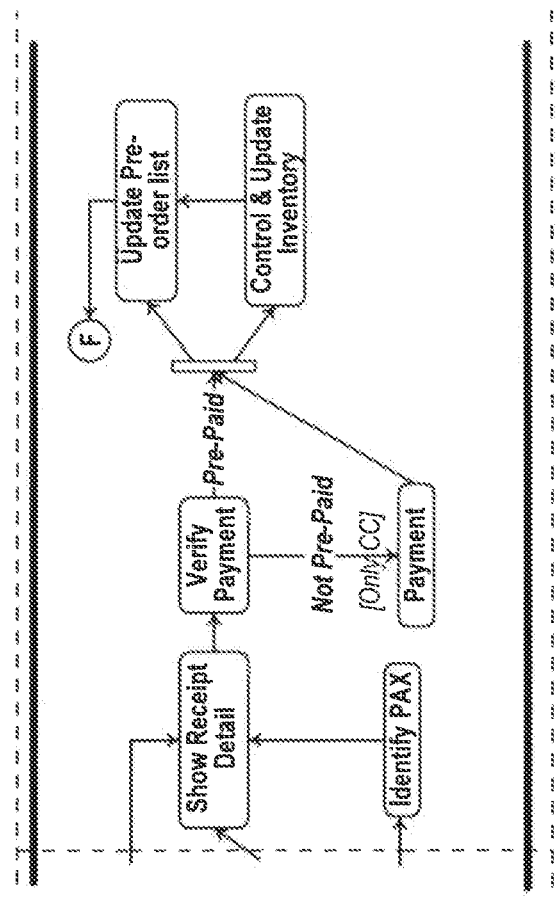
Figures 4, 17B:
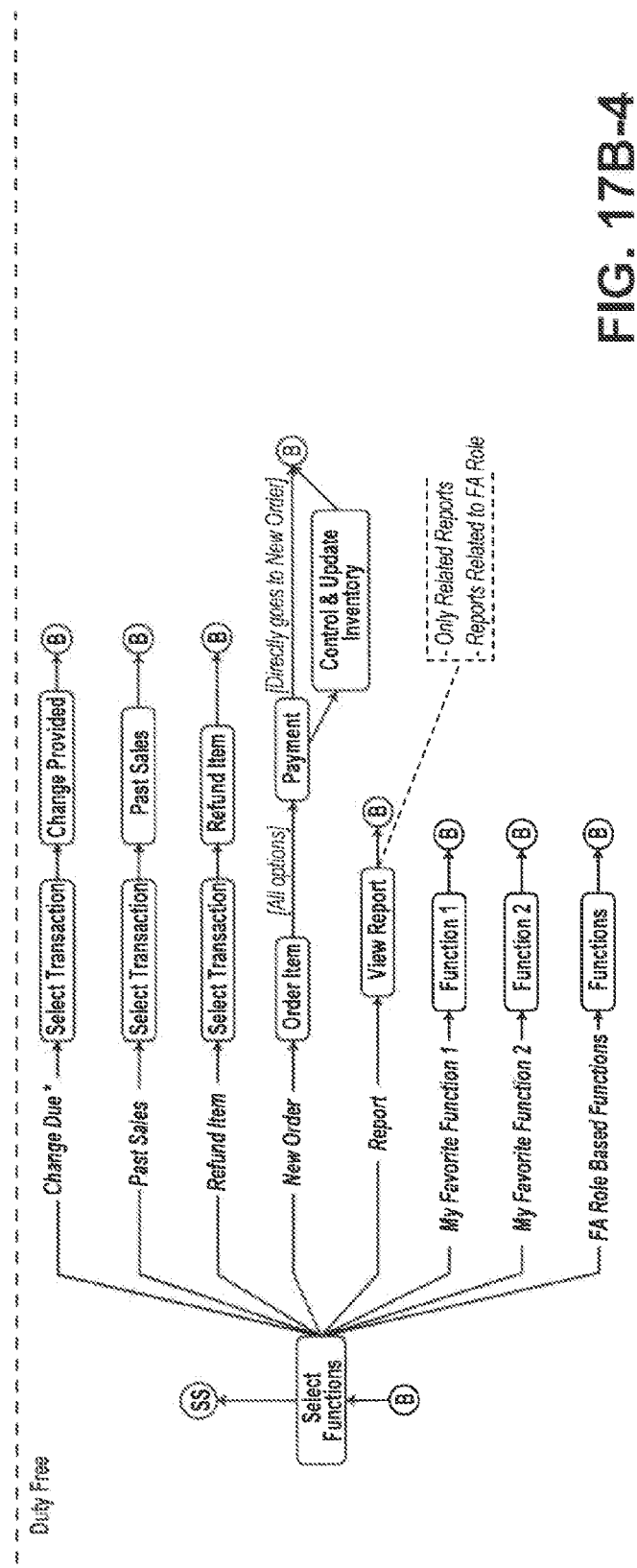
Figures 1, 17C:
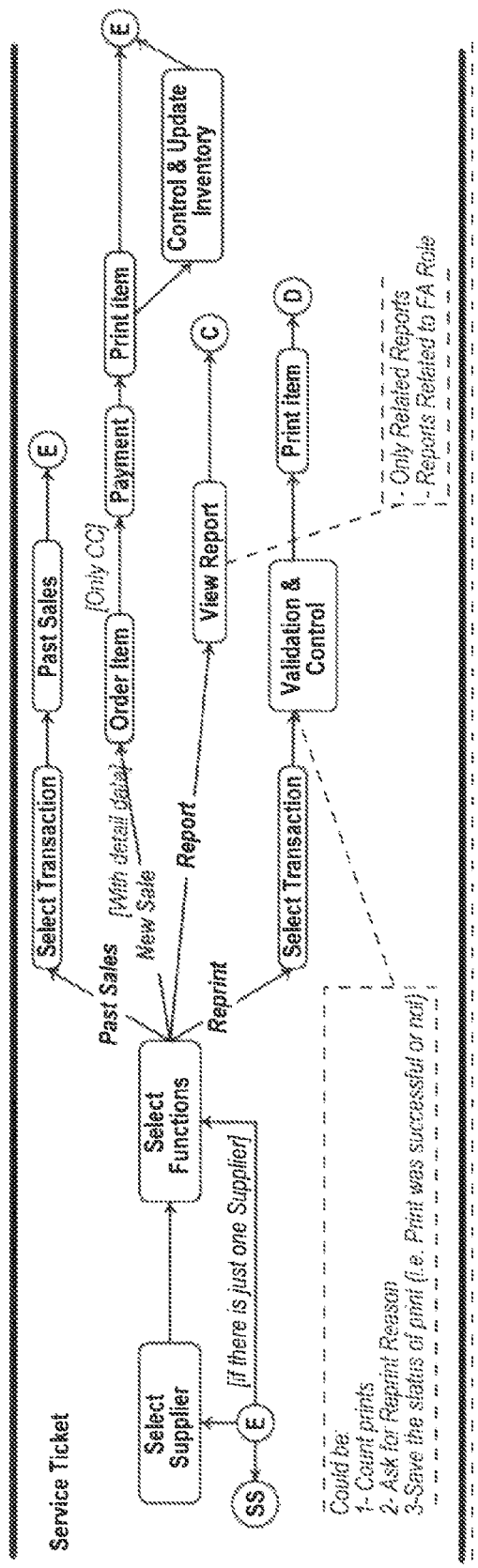
Figures 3, 17C:
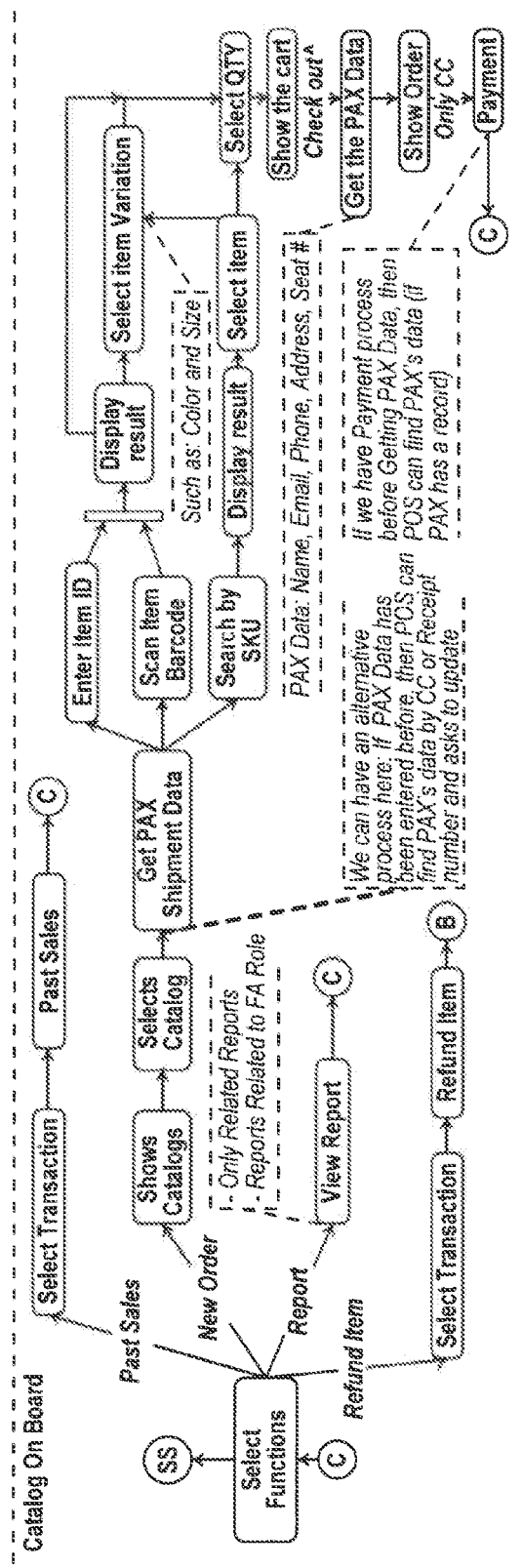
Figures 4, 17C:
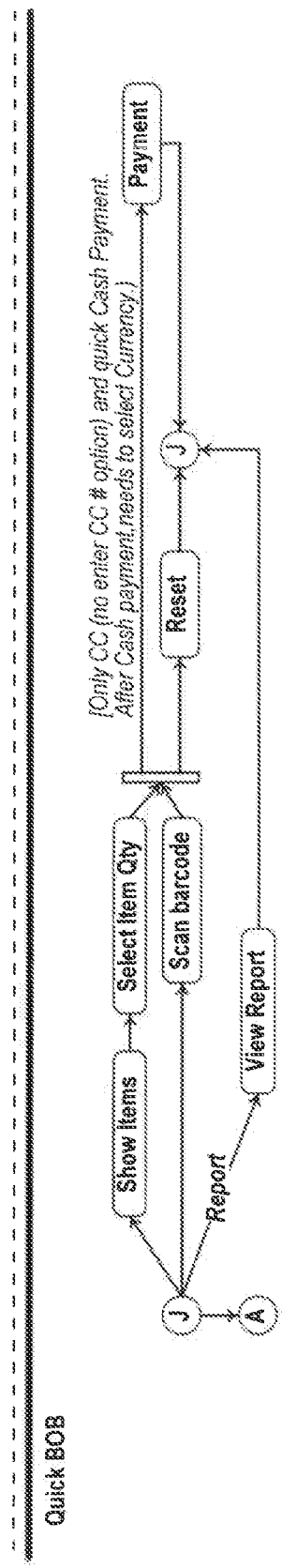
Figure 17D:
Figures 1, 17D:
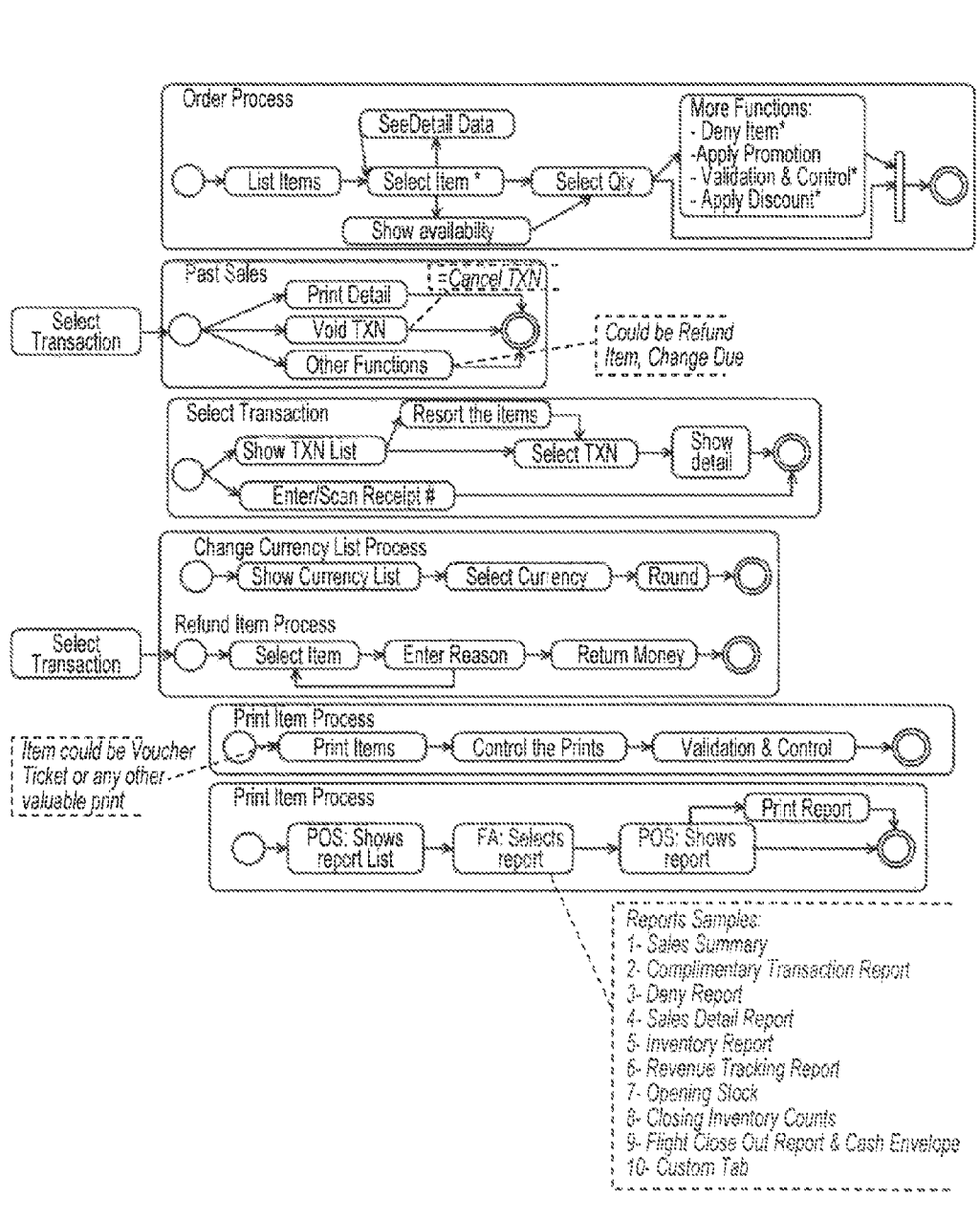
Figures 2, 17D:
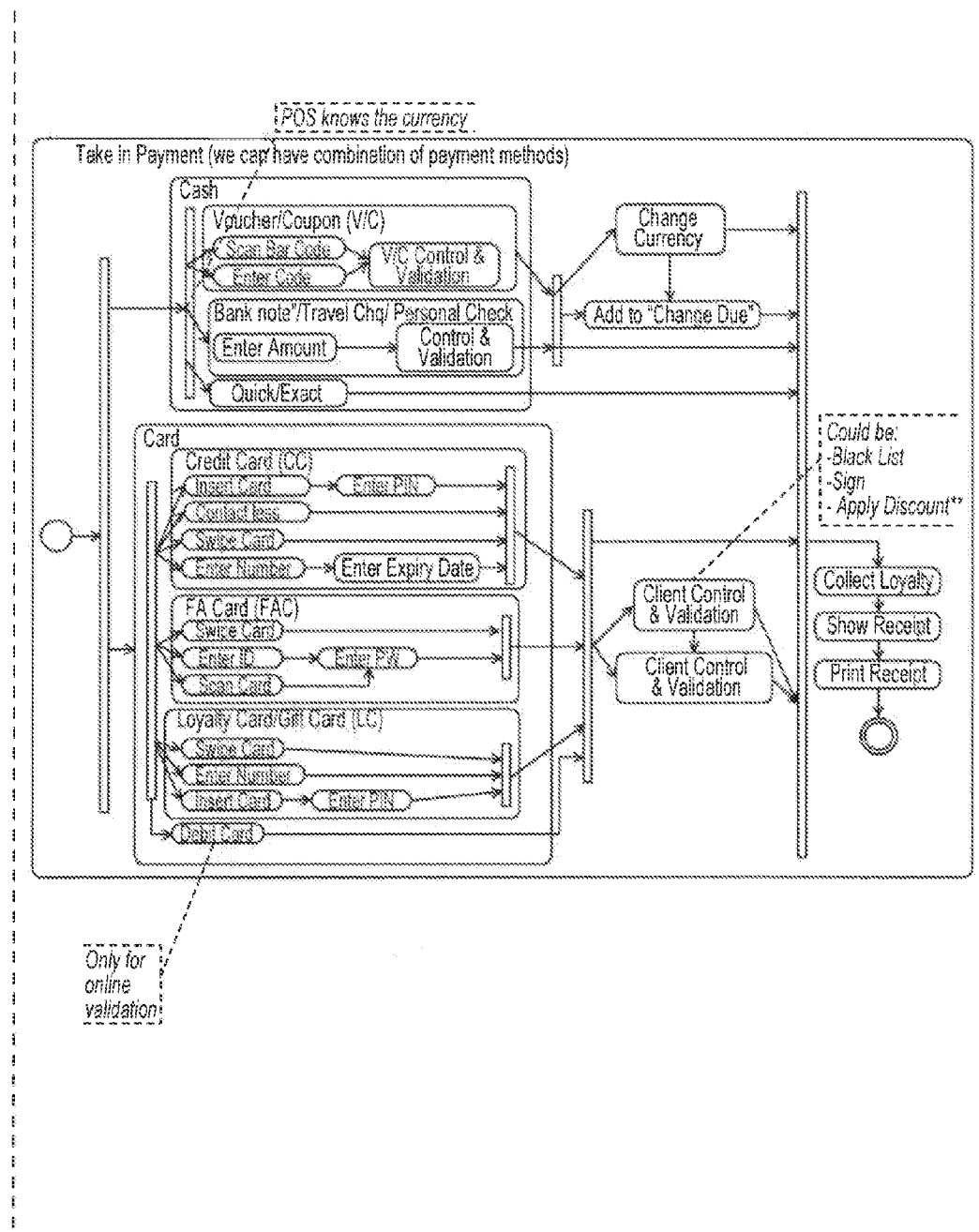

FIG. 15 is a block diagram depicting a post-flight process flow according to one embodiment. At 1501 data relating to one or more in flight transactions made according to system 200 may be received. At 1502, one or more commercially available credit card transaction processing tools or services may be utilized to validate card transactions and/or convert and transfer monies. At 1503, system 200 operator may receive money acquired at 1502. At 1504, various reviews of transaction data may be performed, including the reconciliation of voucher issues, the generation of reports and/or alerts regarding transactional information (for example voucher issues, payment issues. Various information may be updated in system 200, possibly including the update one or more web-based systems for processing and/or communicating system 200 data. At 1505, one or more system 200 users may receive payment or payment related information via system 200, including: flight attendants, airlines, vendors of products and/or services, and/or one or more banks of flight attendants, airlines, or vendors.

FIGS. 16A-E are a flow diagram depicting one embodiment of various interactions that are contemplated for purposes of facilitating the presentation and sales of products and/or services via a mobile retail environment according to one embodiment.

Additional Aspects of the Invention in Various Other Embodiments

Forecasting & Planning Module

This module is fundamental to establishing the automatic relationship between the Operational Schedule and Mobile Virtual Stores. The Operational Schedule is imported into the system from the operator's operational systems. Routing schedules are analyzed and coded in a way that the planning criteria groups the routes so that the planning business rules applying to assortments, inventory standards, and promotions are associated automatically to the schedule of operations or departures. The output of this module is the On-Board Retail (OBR) Provisioning Schedule, which can be used by the caterers or handlers in pre-departure preparation. This provisioning schedule is then used by the Warehouse Logistics module to pick-up, replenish and prepare specific inventories to load, and the POS Manager component to load the product and inventory information into handheld Point-of-Sale (POS) devices or server-based POS distributed via seatback screens.

Store Optimization Module

This module optimizes the provisioning load plan based on the route, the inventory standard associated to the route, its historic or expected consumption per product/service, the characteristics of the products to board, the capabilities of the ground handlers per station, and the minimization of the handling and ground transportation movements. This optimization component is especially efficient in complex or long routings that present several options for provisioning or replenishment. The input to this module is the OBR provisioning schedule and the output is the same schedule showing a modified load plan with optimization applied.

Warehouse Logistics Module

The pre-departure operation ends with the physical preparation of the galley equipment (trolleys, carriers, containers, etc) loaded or replenished with new inventory to be sold on-board. This tool allows ground handlers to see the schedule, select the departures to prepare ahead of time, modify the load plan if necessary—due to last-minute changes—prepare, seal, control, annotate any issues and dispatch the trolleys or containers. The module comprises outbound and inbound components. Inbound controls the arrival of galley equipment, seals issues, inventory offload counts, and assignment of equipment for replenishment and preparation for the outbound operation. The offload and replenishment operation supports automatic "pick-lists" reflecting inventory standards per departure and is configurable by item quantities associated to the trolley or container unit (called assemblies), or to drawers, trays, sub-containers (called sub-assemblies), and their positions within the assemblies.

POS Module

The handheld device is designed for the passenger travel industry to facilitate all on-board sale and refund transactions. It's a state-of-the-art, user-friendly, rugged POS computer featuring a touch-screen that is the largest in its class. The unit supports all electronic payments, as well as cash, vouchers, coupons, and loyalty card based payments. The unit communicates with the POS Manager component in the GuestLogix POS Back-Office software using wireless communications (GSM/GPRS, CDMA) or direct plug-in using USB. GuestLogix may propose other device configurations with PCI PED compliance to meet the specific needs of its clients. The POS software is hardware agnostic and can be easily adapted to multiple system environments.

Seatback Screen Module

Personalized programming and access to news, movies, games, TV shows, music, other multimedia as well as the Internet are becoming available through on-board seatback or on-seat multimedia screens. The GuestLogix Mobile Virtual Store™ platform integrates and interacts with on-board personalized entertainment networks. It integrates content and controls utilization and connectivity facilitating the onboard payment processes, channeling the electronic payments either offline or online, in connection with the on-board entertainment server.

Point-of-Sale Module

The POS software comprises six components: access and security, inventory depletion control, product or service selection, payment process, reporting, and data transmission. The handheld POS integrates all these components enabling a flexible configuration, multiple graphic user interfaces and multiple models to adapt to the needs of the operator and the business environment in any language.

The access and security component configures and controls the login into the device providing multiple options such as typing ID and Password, swiping a magnetic ID card, or scanning the ID card barcode. This module also controls the access levels to functions and processes according to user authority, and the closing sales process.

The inventory depletion control component enables the configuration of the inventory control on-board, allowing several models and providing different screens and reports to be able to input inventory counts, control and synchronize the depletion per device and the consolidation in one primary device for end of route control and consolidated transmission.

The product or service selection configures and controls the selection of any number of items and services by published category or by direct entry of a code, and according to each transaction of sales or refund. It can also open a tab or sales account guaranteed by a credit card, process rentals, deal with any sales promotions applied to single or multiple products and services, including complex combos or meal deals with options and alternatives within the same or different product categories, and can present and account the items in multiple prices according to the different currencies published in the on-board sales catalogue. This component further includes the order summary screen, supporting the change of currency either based on prices per currency or exchange rate.

The payment process module configures and controls all the aspects and steps that facilitate the payment of the ordered items and services. Any combination of forms of payment can be configured, as well as any limitations or restrictions in the forms of payment per catalogue section or on-board sales service, such as limiting transactions to cash and coupons, or just credit and debit, or any other combination, either applying to all on-board sales, or to some of them. This component takes care of the closing tab process, change due, refund transactions, and any other function or process related to payment and accounting of the payment transaction in the database in the POS device.

The reporting module offers a variety of pre-established reports that are normally attached to specific functions such as change due, tab control, sales promotions available, sales transactions list for refund or receipt, sales summary, inventory depletion, inventory available, last transaction receipt, as well as customized ones to the needs of each client.

The data transmission component takes care of the preparation of the data for upload, encryption of the credit and debit sensitive data as per PCI DSS compliant methods, the separation of the packets of data, those that go directly to the secure network of the credit and debit transactions acquirers or processors, and those that go also through secured network data transfer to the POS Manager and Back-Office database. This component, in communication with the POS Manager module in the Back-Office system, controls the success of the transmission and finally erases the database in the POS device. During this process, the POS Manager controls the status of the device and downloads, and accepts any updates or data that the POS device needs for further use.

IFE Integration Software

This software controls and configures the integration of content in the on-board In-flight Entertainment (IFE) Server with the GuestLogix POS solution. It enables the integration of catalogues of products/services, adds prices and conditions, and facilitates the on-board purchase, rental and the payment offline or online. The software provides portal control to Internet access and specific Web sites and enables to condition the access to the payment of service fees that generate and control the ancillary revenue generated in the retail transactions on-board.

Payment Processing

Once the POS Manager verifies and completes the communication with the POS device and collects all the files received from the device, it decides when to send the batches of data to the electronic payment card processors or acquirers. The POS Manager knows which batch goes to which processor network and controls the delivery of these batches. During this time it records the sales and refund transactions data in the GuestLogix Back-Office system database. Each transaction is uniquely identified. To comply with PCI DSS rules the card transactions do not include sensitive card data, just the unique ID of the transaction, and if available the graphic image of the signature. The transactions are stored identifying the type or types of payment involved, and the currency of the payment. When the card payment processors return the information of the acceptance or not of those transactions, the corresponding settlement data is added to each record.

Funds Tracking & Recovery

The cash payments are controlled in the OBR system by two modules: the first, manages and records the cash deposits (cash bags or proceeds envelopes) and tracks reconciliation and delivery to the bank or automatic teller machines; the second, audits discrepancies and generates management alerts by email to take immediate action when the discrepancies are above a certain established threshold. The Cash Management component manages the specific business environment of each implementation defining and importing the different currencies accepted in on-board payments; importing and synchronizing the currency exchanges rates to the base currency (or currencies) of the implementation; managing or importing the data of the different bank accounts and locations where the cash is deposited; and, controls the handover of cash proceeds from one handler to another in the process by generating and controlling receipts.

Device Tracking

This module controls the inventory of POS devices, the assignment of each device to an aircraft or vehicle, to a base, or to a person, as well as the status and location of each by tracking and reporting every time a device communicates with the POS Manager in the Back-Office software. The module also controls the repair status and identifies devices that are not operative, and alerts management on those that should be operative and could be missing, before they are reported missing, by managing the threshold of time during which a device that is operative has not communicated with the POS Manager.

Sales & Inventory Reconciliation

The Mobile Virtual Store™ platform captures and records data on: sales and refunds per form of payment and currency from the POS device transmission; funds deposited; cashier reconciliation and card or electronic payments settled; all other forms of payment including vouchers, coupons, complimentary, loyalty points; and other data on the inventory opening, depletion for sales, inventory closing, as well as warehouse offload counts, and warehouse inventory opening per inventory standard routing. As a result, the platform automatically reconciles all sales and inventory actions through its system which results in a set of standard reports.

The module also identifies all the discrepancies, based on the three-way analysis of Sales, Funds Deposits, and Inventory Depletion. This data retained for further analysis by other modules, for reporting purposes and alerts processed by the Workflow Manager module.

Fraud Detection

The Fraud Detection Software examines various discrepancies and scenarios, to identify specific patterns which are associated with fraud activity. The module uses pre-defined measurements to detect suspicious situations, and assigns and aggregates scores to employees. These scores can then be used to determine whether an individual is engaging in potential fraudulent behaviour. This examination includes: funds tracking from post-flight through to Bank Deposit; funds recovery immediately at the instances of funds handling irregularities; pattern recognition of entities, entity relationships and activities to identify potentially fraudulent behaviour; detection analysis, including employees, suppliers and other third-parties as required.

Supplier Audit

This module enables the generation of an electronic pro-forma invoice based on provisioning and loading of scheduled and ad-hoc services. It allows suppliers and handlers to view and edit the pro-forma invoices online and save them in the GuestLogix Mobile Virtual Store™ database.

The module executes an automatic audit and reconciliation of handling pro-forma invoices, and displays the results of the audit, accepting, suspending, or rejecting invoices from suppliers and handlers.

Reconciliation Accounts Payable Authorization

The Supplier Audit module also enables manual reconciliation of electronic invoices that were not automatically accepted.

The module generates payment accruals as well as data extracts and reporting with the A/P Authorization to Pay, for the Accounts Payable system or department.

Performance Detection

The Performance Management module is an independent module responsible for the analysis of discrepancy measurements and for finding patterns by employee, or by product that can be applied to the detection of unusual conditions. This can be used to detect both positive, and negative performance, and/or potential fraud. The Performance Detection engine applies statistical analysis methods to analyze and detect performance patterns of employees, locations, suppliers and products that perform above or below expectations.

Performance Analysis

Performance Management analyzes and ranks the performance based on the combination of discrepancy types and scenarios (calibrated regularly, based on business requirements), using the sales revenue and inventory data from the Funds & Inventory Handler. Each scenario may have up to three criteria applied to refine the analysis of the performance.

Once the measurements are evaluated, an aggregate score is generated for each employee, supplier and/or product. Each discrepancy type and scenario is assigned a relative percentage weighting. The employees/suppliers/products are then assigned a score based on this relative weighting and the results of the measured exceptions.

Reporting

Employee Performance—Exceptional or poor performance is deduced from the sales and inventory management data. Each employee's sales may be matched to historical sales, inventory depletion, and other management defined standards. All employees are ranked using the defined scenarios, providing a list of top and bottom performers that may be used for issuing incentives or determining training requirements. Employees may be evaluated over a defined period of time (e.g. yearly, quarterly, or monthly).

Supplier Performance—Exceptional and poor supplier performance is deduced from inventory management data, including data on damaged product. A supplier's performance is ranked across the locations in which it provides service, providing a list of top and bottom performing locations.

Product Sales Performance—In addition to the product sales performance reports and exports, analysis is performed on individual products—sales revenue per passenger or turnover—and compares the results to sales targets and other products. All products are ranked using the defined scenarios, providing a list of top and bottom performers that may be used for planning inventory on future flights. Products may be evaluated over a defined period of time, such as year, quarter, or month, and results may be filtered by sales type, category, or sub-category.

Categorization Module

Categories help the Merchandising and Retail Manager group the different products and services offered on-board by affinity of use or consumption, popularity, specific time when they are offered, specific service or product brand name, or other merchandising and purchasing reasons. Sample categories include: Gifts, Food & Beverage, Kids Toys, Electronics, OB Personal Entertainment, Ground Transportation Vouchers, Events & Theatre Tickets, and Perfumes & Skin Care.

Products or services can be offered physically on-board or virtually by means of on-board ordering and paying with later delivery, or online access, either within the on-board local network or on-board Internet access. The operator may define, maintain and modify these groupings into merchandising categories, which may then match the on-board printed catalogue categories, as well as the products/services loaded into the handheld POS device. Another important categorization is the On-Board Services categorization, which enables to link different services offered on-board with the sequence in which they are delivered during the trip. Products inventoried in the system have also definable sub-categories.

Assortment Planning Module

Assortments or combinations of products and or services may form a specific inventory or be part of a specific inventory standard that is adapted to a specific market, specific time, or route profile. The assortment includes the definition of the combination of categories of product or services and can include the quantities or relational percentage between them.

The Assortment Planning module helps operators to map and adapt their Mobile Virtual Store™ demand profile to the schedule of operations and later analyze sales by each Mobile Virtual Store™ type. The module offers a powerful Planning Criteria engine to automatically plan assortments for the next schedule(s) using business rules.

This module also includes Demand Analysis & Store Optimization which enables merchandisers to optimize the revenue and profit of each Planned Load Plan by taking historical analysis of product consumption by defined and loaded assortment, and use it to create "what If" scenarios to estimate consumption, revenue and profit using more efficient assortments. The efficiency of an assortment for a specific galley type is measured by the relationship between volume-weight and revenue or volume-weight and profit. The merchandiser can immediately see the "what-if" result of applying a historically more efficient assortment to a specific departure or group of departures, based on origin/destination, or destination market, day-of-the-week, and time-of-the-day.

Promotions Management

The Sales Promotions module can increase sales, reduce waste, promote new products and services, balance the demand of high profit and low profit items, increase or renew awareness and increase revenue. The underlying engine enables marketers and merchandisers to define and plan any imaginable combination of Purchase Condition and Benefit. The options include BOGOF (Buy One Get One Free) to BMGM (Buy More, Get More), to sophisticated Meal Deals and Combos with very complex logic that include selections through various categories with alternatives and exceptions.

One of most useful features is the automatic discount of any perishable items on-board from a certain time of the day on, which helps protect the profitability of on-board food sales. The engine can define Buyers and allow discounts or other promotions to crew members, employees or any other Passenger-Guests. The Planning Criteria Engine is reused in this module to establish parameters and Planning Rules to associate promotions with departures or routing profiles.

Alert & Escalation Workflow Manager

Alert & Escalation Manager is responsible for managing alerts generated by the operational, sales, and reconciliation discrepancies found or analysed by most modules of the Mobile Virtual Store™ platform, such as the Funds Tracking & Recovery, the Sales & Inventory Reconciliation, the Performance Detection, the Supplier Performance, and the Product Sales Performance. The Alerts and Escalation Manager then takes the necessary steps to distribute alert notifications to the appropriate recipients and ensures that the action is taken in a timely manner.

The Alert & Escalation Manager ensures that management receives timely critical information using various message formats, such as email and fax. Alerts that are not responded to within a pre-defined period of time, indicating little progress towards a resolution, will be escalated up the management hierarchy until the appropriate actions are taken. All actions taken are stored in an alert log, allowing for collaboration in resolving issues and detailed tracking of progress. Once an alert is closed, it is excluded from all future alert distributions, or fraud and performance analysis.

Conclusion

The embodiments above are intended to be illustrative and not limiting. Additional embodiments are within the claims. In addition, although aspects of the present invention have been described with reference to particular embodiments, those skilled in the art will recognize that changes can be made in form and detail without departing from the spirit and scope of the invention, as defined by the claims.

Persons of ordinary skill in the relevant arts will recognize that the invention may comprise fewer features than illustrated in any individual embodiment described above. The embodiments described herein are not meant to be an exhaustive presentation of the ways in which the various features of the invention may be combined. Accordingly, the embodiments are not mutually exclusive combinations of features; rather, the invention may comprise a combination of different individual features selected from different individual embodiments, as understood by persons of ordinary skill in the art.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims for the present invention, it is expressly intended that the provisions of Section 112, sixth paragraph of 35 U.S.C. are not to be invoked unless the specific terms "means for" or "step for" are recited in a claim.

What is claimed is:

1. An automated system for configuring point-of-sale (POS) devices in dynamically-changing mobile retail environments, the system comprising:
   a vendor/supplier connector module that is constructed to facilitate automated exchange of product data over a computer network with a plurality of different vendors or suppliers of products or services, wherein the product data includes information corresponding to a set of products or services to be ordered or delivered on board mobile retail environments;
   a carrier connector module that is constructed to facilitate automated exchange of transportation data over a computer network with a plurality of different carriers, wherein the transportation data includes vehicle and departure/arrival information corresponding to specific mobile retail environments;
   a provisioning module that is communicatively coupled to the vendor/supplier connector module and to the carrier connector module, the provisioning module being constructed to automatically determine, based on the product data and on the transportation data, mobile inventory requirements representing certain members of the set of products or services corresponding to specific individual mobile retail environments;
   a POS customization module that is communicatively coupled to the provisioning module, the POS customization module being constructed to automatically generate re-configuration data to be uploaded to each of a plurality of POS interfaces via a mobile store integrator module, wherein the re-configuration data limits each of the plurality of POS interfaces to facilitating sales of only certain members of the set of products or services that correspond to a specific one of the mobile retail environments based on the mobile inventory requirements for that mobile retail environment.

2. The automated system of claim 1, further comprising:
   a first POS interface device of the plurality of POS interfaces, wherein the first POS interface device is a vehicle-based POS interface device having a display device and a user input device.

3. The automated system of claim 2, wherein the first POS interface device comprises a hand-portable unit associated with a first vehicle.

4. The automated system of claim 2, wherein the first POS interface device comprises a mounted unit installed in a first vehicle.

5. The automated system of claim 1, further comprising:
   a network-based POS interface of the plurality of POS interfaces, the network-based POS interface being implemented on a client computer device having a display device and a user input device, the client computer device running a browser application, wherein the browser application is communicatively coupled to a server that hosts the network-based POS interface.

6. The automated system of claim 5, wherein the network-based POS interface is on board a vehicle on which the mobile retail environment is established.

7. The automated system of claim 5, wherein the network-based POS interface is implemented on a personal computer that is communicatively coupled to the server via the Internet.

8. The automated system of claim 5, wherein the network-based POS interface is configured to facilitate pre-ordering of products or services to be delivered in at least one mobile retail environment of a series of the at least one mobile retail environments associated with a first passenger who is to be present in the series of the at least one mobile retail environments, whereby the network-based POS interface displays a limited assortment of products or services to be made available in a selected at least one mobile retail environment of the series for pre-ordering, and whereby the network-based POS interface provides to the first passenger a virtual token associated with the first passenger to be verified on-board the selected at least one mobile retail environment to permit delivery of a pre-ordered product or service.

9. The automated system of claim 8, wherein the virtual token is associated with passenger specific information from the transportation data that is specific to the first passenger.

10. The automated system of claim 1, wherein the vendor/supplier connector is adapted to transmit pre-order information to a first vendor or supplier, wherein the pre-order information is generated based on the transportation data and on data generated via at least one of the plurality of POS interfaces.

11. The automated system of claim 1, wherein at least a portion of the plurality of different vendors or suppliers of products or services includes vendors who are merchants of record; and
    wherein the vendor/supplier connector is adapted to facilitate an exchange of transaction information between the merchants of record and the plurality of POS interfaces.

12. The automated system of claim 1, wherein the transportation data includes passenger-specific information for at least a first passenger.

13. The automated system of claim 12, wherein the provisioning module is constructed to analyze the passenger-specific information and the transportation data to determine a first passenger-specific mobile retail environment corresponding to a travel schedule of the first passenger; and
    wherein the POS customization module is adapted to automatically re-configure at least one POS interface corresponding to the first passenger-specific mobile retail environment such that the at least one POS interface limits a selection of products or services to a first passenger-specific subset relevant to first passenger.

14. The automated system of claim 13, wherein the passenger-specific information for at least the first passenger includes at least one of: loyalty program information, and payment information associated with at least the first passenger; and
    wherein the POS customization module is adapted to automatically re-configure at least one POS interface corresponding to the first passenger-specific mobile retail environment such that the at least one POS interface has available the loyalty program information and/or the payment information associated with at least the first passenger to facilitate completion of transactions with the first passenger.

15. The automated system of claim 1, wherein the transportation data includes crew-specific information associated with at least one crew member, wherein the crew-specific information relates to services or transactions that are permitted in at least one mobile retail environment.

16. The automated system of claim 1, wherein the provisioning module is further adapted to automatically re-categorize products or services represented by the product data into a new categorization hierarchy corresponding to at least a first mobile retail environmemt.

17. The automated system of claim 1, further comprising:
    a POS programmer device adapted to be communicatively coupled to the POS customization module, and constructed to:
        receive at least a subset of the re-configuration data;
        communicate with a POS interface located on-board a vehicle and, based on the subset of the re-configuration data, to automatically configure the POS interface.

18. The automated system of claim 1, wherein the on-board retail scheduler module is communicatively coupled to the POS customization module and is adapted to exchange inventory quantity-related information with the POS customization module.

19. The automated system of claim 1, wherein the on-board retail scheduler module is communicatively coupled to a POS programmer device that is adapted to configure a POS interface located on-board a vehicle based on a subset of the re-configuration data; and
    wherein the on-board retail scheduler module is adapted to exchange inventory quantity-related data with the POS programmer device.

* * * * *